US008888121B2

(12) United States Patent
Trevino et al.

(10) Patent No.: US 8,888,121 B2
(45) Date of Patent: *Nov. 18, 2014

(54) TOWING VEHICLE GUIDANCE FOR TRAILER HITCH CONNECTION

(75) Inventors: James S. Trevino, Arch Cape, OR (US); James Edward Karner, Orangevale, CA (US); James A. Wehrs, Tigard, OR (US)

(73) Assignee: Target Hitch LLC, Arch Cape, OR (US)

( * ) Notice: Subject to any disclaimer, the term of this patent is extended or adjusted under 35 U.S.C. 154(b) by 578 days.

This patent is subject to a terminal disclaimer.

(21) Appl. No.: 13/107,730

(22) Filed: May 13, 2011

(65) Prior Publication Data
US 2011/0216199 A1 Sep. 8, 2011

Related U.S. Application Data

(63) Continuation-in-part of application No. 11/698,708, filed on Jan. 25, 2007.

(51) Int. Cl.
*B60D 1/36* (2006.01)
*H04N 7/18* (2006.01)

(52) U.S. Cl.
CPC ... *B60D 1/36* (2013.01); *H04N 7/18* (2013.01)
USPC .......................................... 280/477; 348/148

(58) Field of Classification Search
USPC .......................................... 340/431; 280/477
See application file for complete search history.

(56) References Cited

U.S. PATENT DOCUMENTS

| 2,765,701 | A | * | 10/1956 | Carrigan ....................... 356/155 |
| 4,552,376 | A | * | 11/1985 | Cofer ............................ 280/477 |
| 5,452,982 | A | | 9/1995 | Engle |
| 5,461,471 | A | | 10/1995 | Sommerfeld |
| 5,513,870 | A | * | 5/1996 | Hickman ...................... 280/477 |
| 5,650,764 | A | | 7/1997 | McCullough |
| 5,729,194 | A | | 3/1998 | Spears et al. |

(Continued)

FOREIGN PATENT DOCUMENTS

| EP | 921056 A2 * | 6/1999 | ............. B62D 53/12 |
| EP | 1238577 A1 | 11/2002 | |
| GB | 2277721 A | 9/1994 | |
| WO | 2012/0158598 | 11/2012 | |

OTHER PUBLICATIONS

Trevino, Int' Search Report and Written Opinon dated Jul. 27, 2012 for PCT/US2012/037738, 12 pages.

(Continued)

*Primary Examiner* — Emmanuel L Moise
*Assistant Examiner* — Mahran Abu Roumi
(74) *Attorney, Agent, or Firm* — Chernoff, Vilhauer, McClung & Stenzel LLP

(57) ABSTRACT

Apparatus and a method for its use to assist an operator of a towing vehicle in backing the towing vehicle accurately into a position in which parts of a hitch can be mated to connect the towing vehicle with a trailer. A camera in a towing vehicle module provides the towing vehicle operator a video image of the trailer and a target mounted on it. A beam of light from the towing vehicle module and falling on the target is visible in the video image to show when the towing vehicle approaches and reaches a position in which the hitch can be mated.

43 Claims, 32 Drawing Sheets

(56) References Cited

U.S. PATENT DOCUMENTS

| | | |
|---|---|---|
| 5,951,035 A | 9/1999 | Phillips, Jr. et al. |
| 6,100,795 A | 8/2000 | Otterbacher et al. |
| 6,120,052 A * | 9/2000 | Capik et al. ............ 280/477 |
| 6,178,650 B1 | 1/2001 | Thibodeaux |
| 6,222,457 B1 | 4/2001 | Mills et al. |
| 6,252,497 B1 * | 6/2001 | Dupay et al. ............ 340/431 |
| 6,259,357 B1 | 7/2001 | Heider |
| 6,386,572 B1 | 5/2002 | Cofer |
| 6,400,262 B2 | 6/2002 | Bigelow, Jr. |
| 6,581,695 B2 | 6/2003 | Bernhardt et al. |
| 6,592,230 B2 | 7/2003 | Dupay |
| 6,611,744 B1 | 8/2003 | Shimazaki et al. |
| 6,663,132 B1 | 12/2003 | Kizy |
| 6,693,524 B1 | 2/2004 | Payne |
| 6,765,607 B2 | 7/2004 | Mizusawa et al. |
| 6,769,709 B1 | 8/2004 | Piper et al. |
| 6,827,363 B1 | 12/2004 | Amerson |
| 6,900,724 B2 | 5/2005 | Johnson |
| 6,970,184 B2 | 11/2005 | Hirama et al. |
| 6,977,584 B2 | 12/2005 | Milliken |
| 7,006,127 B2 | 2/2006 | Mizusawa et al. |
| 7,058,207 B2 | 6/2006 | Iida et al. |
| 7,142,098 B2 | 11/2006 | Lang et al. |
| 7,171,769 B2 | 2/2007 | Schultz et al. |
| 7,195,267 B1 * | 3/2007 | Thompson ............ 280/477 |
| 7,309,075 B2 | 12/2007 | Ramsey et al. |
| 7,341,264 B2 | 3/2008 | Swannie |
| 7,354,057 B2 | 4/2008 | Milner et al. |
| 7,396,035 B1 | 7/2008 | Smith |
| 7,568,716 B2 | 8/2009 | Dietz |
| 7,715,953 B2 | 5/2010 | Shepard |
| 7,976,155 B2 | 7/2011 | Muhlhoff et al. |
| 2001/0043142 A1 | 11/2001 | Milliken |
| 2001/0045978 A1 | 11/2001 | McConnell et al. |
| 2002/0149673 A1 * | 10/2002 | Hirama et al. ............ 348/118 |
| 2003/0234512 A1 | 12/2003 | Holub |
| 2004/0252019 A1 * | 12/2004 | Paull ............ 340/431 |
| 2005/0074143 A1 | 4/2005 | Kawai |
| 2006/0261574 A1 * | 11/2006 | Milner et al. ............ 280/477 |
| 2008/0180526 A1 | 7/2008 | Trevino |
| 2008/0231701 A1 | 9/2008 | Greenwood |

OTHER PUBLICATIONS

Trevino, European Examination Report for EP 08724631.0, Mar. 5, 2012, 4 pages.

Trevino, European Search Report and Written Opinion for EP 08724631.0, Jan. 27, 2011, 4 pages.

Trevino, International Search Report and Written Opinion, Jun. 11, 2009, PCT/US2008/000704, 7 pages.

* cited by examiner

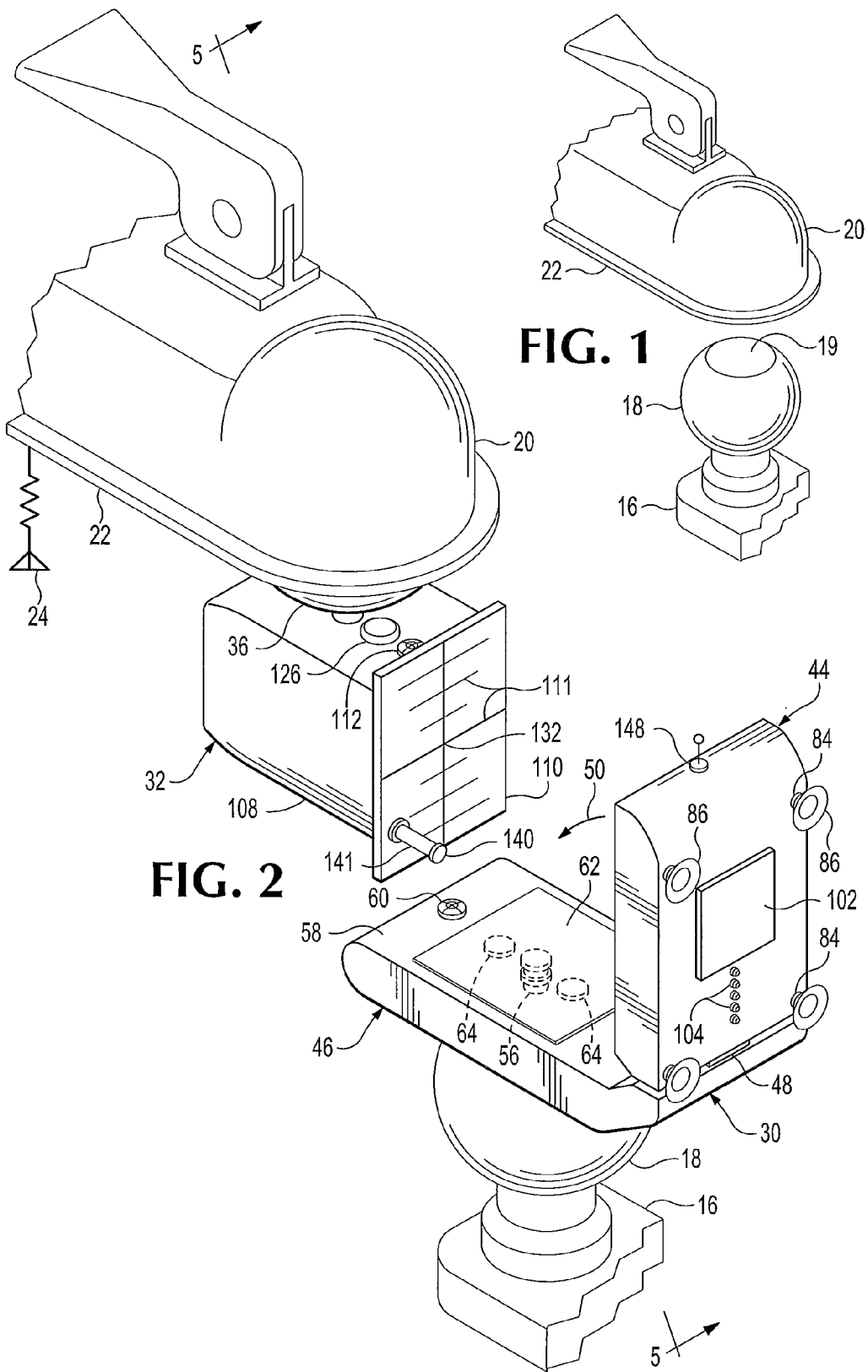

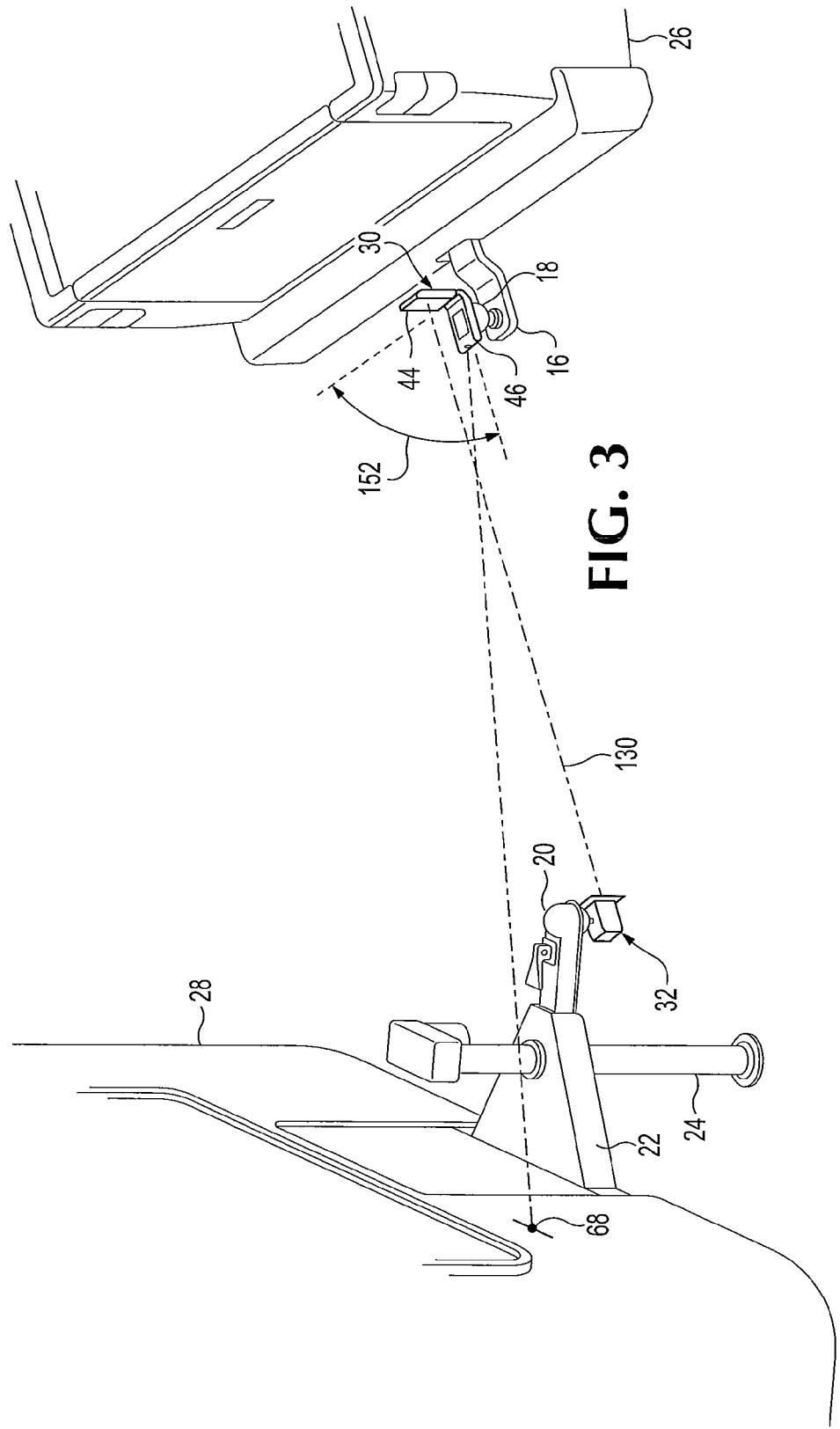

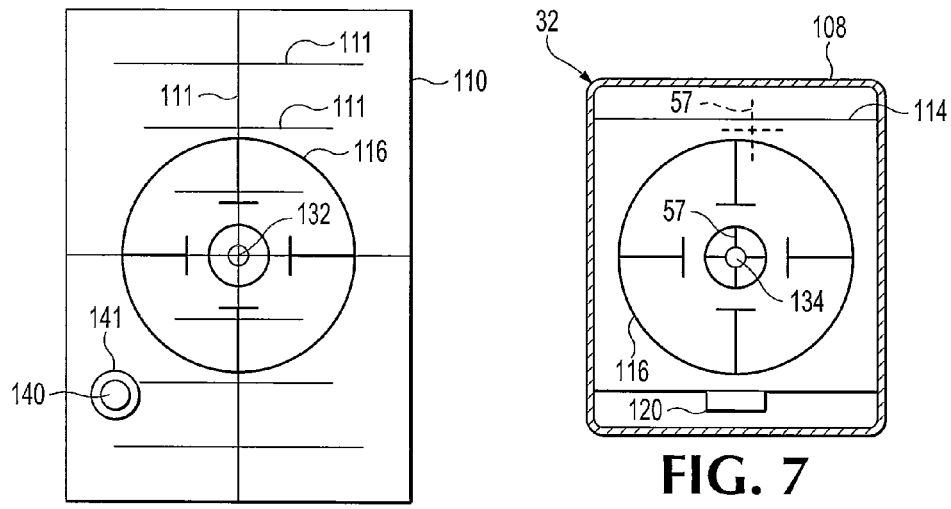
FIG. 6
FIG. 7
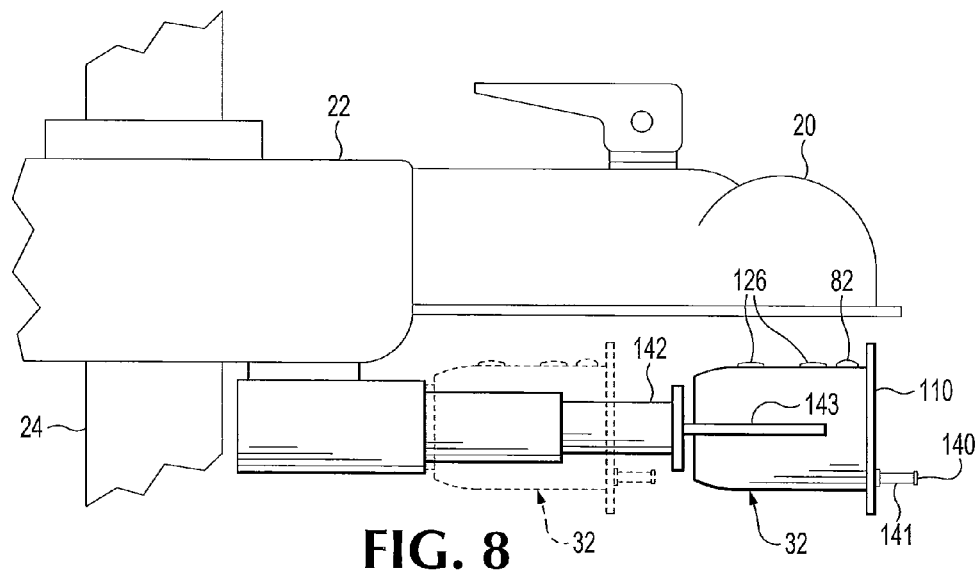
FIG. 8

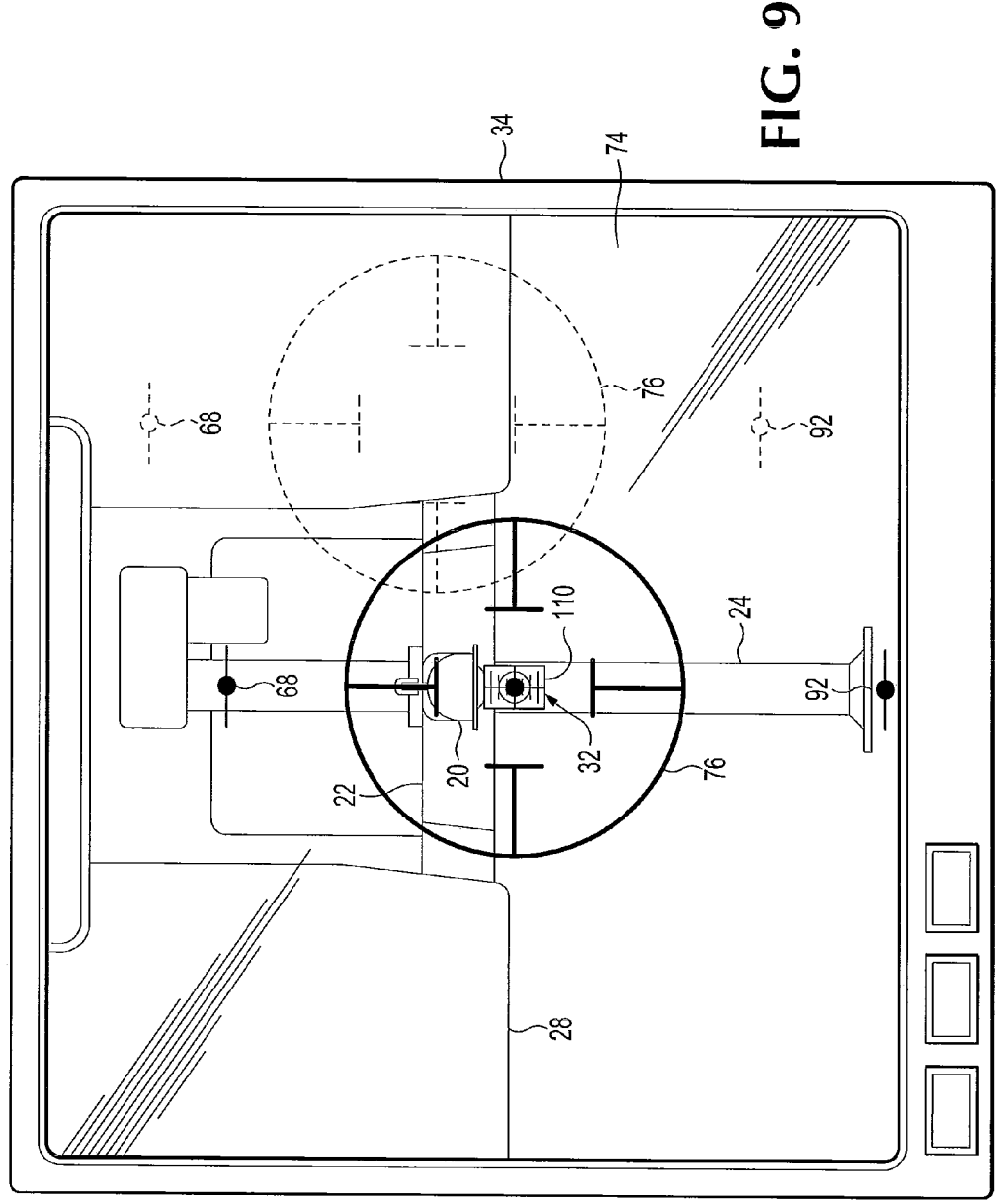

TOWING VEHICLE GUIDANCE FOR TRAILER HITCH CONNECTION

CROSS-REFERENCE TO RELATED APPLICATIONS

The present application is a continuation-in-part of U.S. patent application Ser. No. 11/698,708, filed Jan. 25, 2007.

BACKGROUND OF THE INVENTION

The present disclosure relates to hitching a towing vehicle to a trailer or other vehicle to be towed and relates particularly to a guidance system and a method for its use in guiding a towing vehicle accurately to a position in which a trailer hitch can be coupled between the trailer and the towing vehicle.

Many trailers such as horse trailers and camping trailers are towed behind vehicles such as pickup trucks or sport utility vehicles. While small utility trailers can often be hitched to such a towing vehicle by lifting the tongue of the trailer manually or by moving the tongue of the trailer while its weight is supported on a stand including a wheel or skid, many trailers are large enough so that hitching them to a towing vehicle requires that the towing vehicle be backed accurately to a position in which a trailer hitch ball mounted on the towing vehicle is immediately beneath the coupler carried on the trailer or other vehicle that is to be towed.

On most such towing vehicles the trailer hitch ball or other mating hitch device is not in view of the operator of the vehicle. Even in a pickup truck with its tailgate lowered, the trailer hitch ball is normally hidden from the direct field of view of the pickup truck operator. When the towing vehicle is, for example, a larger truck or a sports utility vehicle loaded with equipment to be used during a long trip, for example, the rearward visibility may be even more limited, so that backing the towing vehicle requires use of side-mounted mirrors. Backing a towing vehicle accurately into position then usually requires a driver operator to rely upon hand signals and voice commands from a second person in position to observe the approach of the towing vehicle toward the trailer. Even for an experienced team of a driver and a signaling person such an operation is difficult, since the final position of the towing vehicle must be accurate within a fraction of an inch.

Many vehicles are now equipped with rearwardly-directed video cameras communicating with video monitors in view of the driver. Even when a trailer hitch member on a towing vehicle is in view of such a camera, however, backing a vehicle into the exact position required for a hitch to be coupled is, at best, difficult and uncertain.

Schultz U.S. Patent Application Publication No. 2005/0193603 shows use of a video camera mounted on the rear of a truck in connection with backing the truck to a required position for connection of a trailer hitch, but shows no way to indicate when the towing vehicle is precisely in the required position.

A team of a driver and a signaling person with little experience, or who only rarely hitch a towing vehicle to a trailer, can experience great difficulty, often requiring many approach attempts before the towing vehicle can be placed in the correct position. When the operation is not quickly successful, it can cause considerable disagreement, blame-laying, and unhappiness, thereby often creating interpersonal stress between people who are attempting to achieve relaxation and enjoyment of travel with a recreational vehicle.

While towing a large trailer such as a recreational vehicle, visibility to the rear of the towing vehicle is greatly obstructed and restricted. Side mirrors on the towing vehicle afford only a limited field of view, particularly behind the vehicle being towed, and backing such a large trailer therefore has often required guidance from a person on the ground, as when the trailer must be backed into a parking spot in a campground.

What is desired, then, is apparatus and a method for its use to facilitate backing a towing vehicle accurately into the required position where a trailer can be coupled to the towing vehicle without the need for directions or hand signals from a second person. Ideally, such apparatus could also be used to provide the operator of the towing vehicle with a clear view of an area behind the towing vehicle during the operation of moving the towing vehicle into position for coupling a trailer hitch, and also to provide a view of areas behind the towed vehicle.

SUMMARY OF THE DISCLOSURE

The apparatus and method disclosed herein, as defined in the claims included herein, which form a part of the present disclosure, provide answers to some of the aforementioned needs.

In one embodiment of an apparatus for guiding operation of a towing vehicle as it is moved to a position in which a trailer hitch can be mated, a camera mounted on the towing vehicle provides an image that can be viewed by the operator of the towing vehicle, showing the front of the trailer and a light beam projected from the towing vehicle toward a target mounted near a part of the trailer hitch on the vehicle to be towed.

In an embodiment of one aspect of the apparatus there is a target to be attached to a hitch component on a trailer that is to be towed, a light beam projector to be attached to a hitch component on the towing vehicle, and a camera to be carried on the towing vehicle in a location where the camera can form and transmit an image to a display that can be viewed by an operator of the towing vehicle as the towing vehicle is backed toward the required hitch-mating position for connecting the towing vehicle to the trailer.

In one embodiment of the apparatus a laser or other light beam projector is located on the towing vehicle so that it projects a light beam onto the target to indicate visibly the relative positions of the hitch portions that must be connected.

According to one aspect of a method disclosed herein for facilitating moving a towing vehicle into a required position relative to a trailer, so that a pair of hitch components can be mated with each other to connect the trailer with the towing vehicle, a target for a light beam is provided on the trailer, a light beam projector is provided on the towing vehicle, and the towing vehicle is backed toward the required mating position of the hitch components while the operator observes an image of the target and the hitch component on the trailer, provided by a camera located on the towing vehicle, and steers the towing vehicle so that the light beam is projected onto the target and can be observed in the camera image as an indication of the position of the towing vehicle relative to the trailer.

The foregoing and other features and advantages of the disclosed apparatus and method will be more readily understood upon consideration of the following detailed description taken in conjunction with the accompanying drawings.

BRIEF DESCRIPTION OF THE SEVERAL DRAWINGS

FIG. 1 is a simplified isometric view of a portion of a trailer tongue including a hitch coupler and a trailer hitch ball mounted on a drawbar portion of a trailer hitch on a towing vehicle, with the towing vehicle in position for the trailer to be coupled to the towing vehicle.

FIG. 2 is an isometric view at an enlarged scale of the trailer hitch ball and portion of a trailer tongue shown in FIG. 1, with an embodiment of a hitch alignment facilitating apparatus mounted on the trailer tongue and the hitch ball of the trailer hitch.

FIG. 3 is a partially diagrammatic view of a rear end of a towing vehicle and a front end of a trailer equipped with the hitch alignment facilitating apparatus shown in FIG. 2, with the towing vehicle in an initial position with respect to the trailer in preparation for backing toward the trailer in order to hitch the trailer to the towing vehicle.

FIG. 6 is a view taken at an enlarged scale in the direction of the line 6-6 in FIG. 5, showing the front target portion of the trailer-mounted module of the hitch-alignment facilitating apparatus disclosed herein.

FIG. 7 is a sectional view of the trailer-mounted, or target, module of the apparatus, taken along line 7-7 in FIG. 5, at an enlarged scale.

FIG. 8 is a side elevational view of a portion of a trailer tongue with a trailer-mounted module carried on a retractable arm attached to the trailer tongue.

Figure 4:
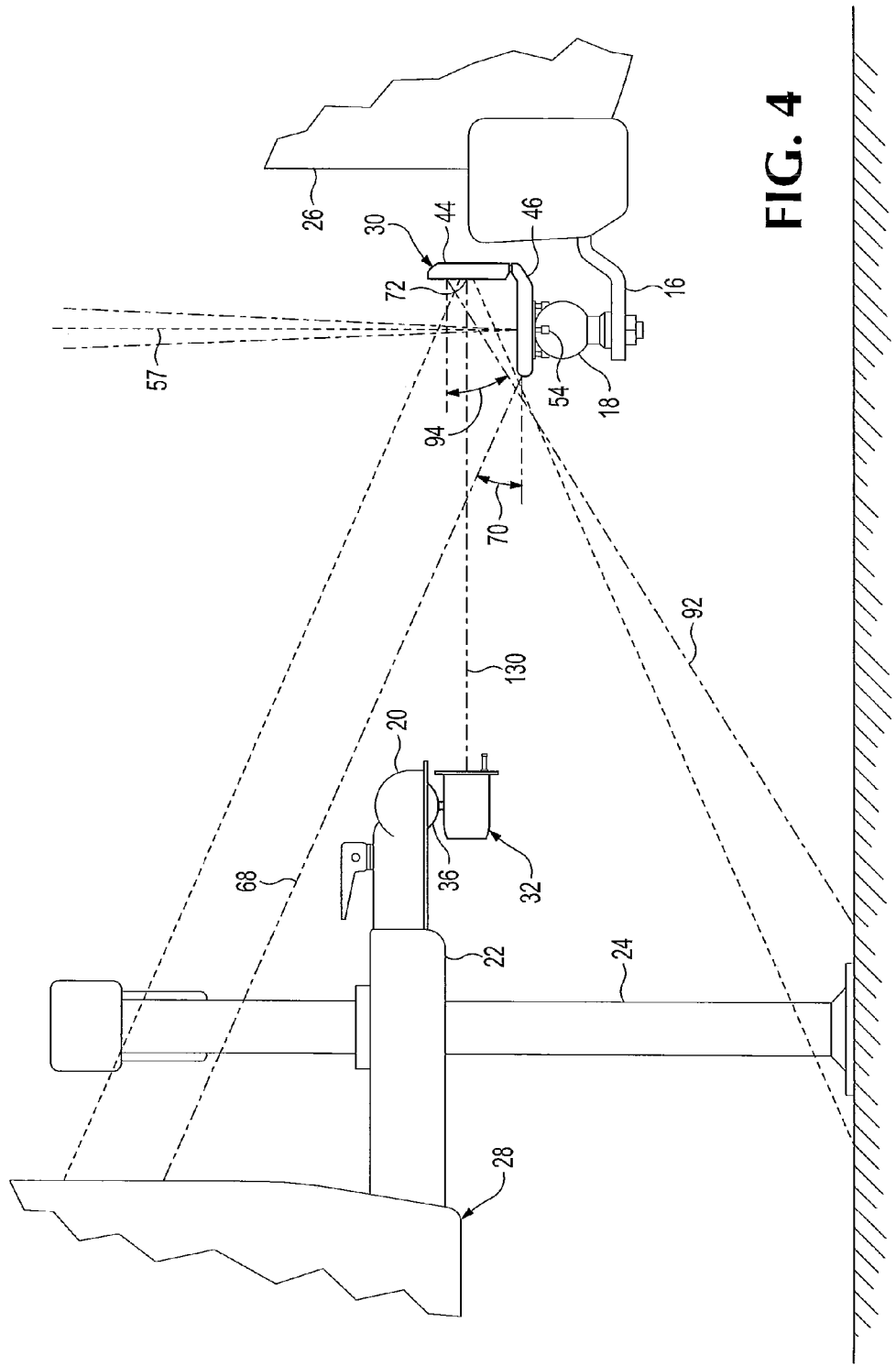
FIG. 4 is a side elevational view of parts of the trailer and towing vehicle shown in FIGS. 2 and 3, showing the towing vehicle and trailer-mounted modules of the hitch-alignment facilitating apparatus in their operative positions.

FIG. 9 is a view of a display monitor screen located within the towing vehicle in position for viewing by the towing vehicle operator, displaying an image transmitted by a video camera portion of the towing vehicle-mounted module of the hitch-alignment facilitating apparatus disclosed herein while the towing vehicle is moving backward toward the trailer with the towing vehicle and trailer in the respective positions represented in FIG. 4.

Figure 10:
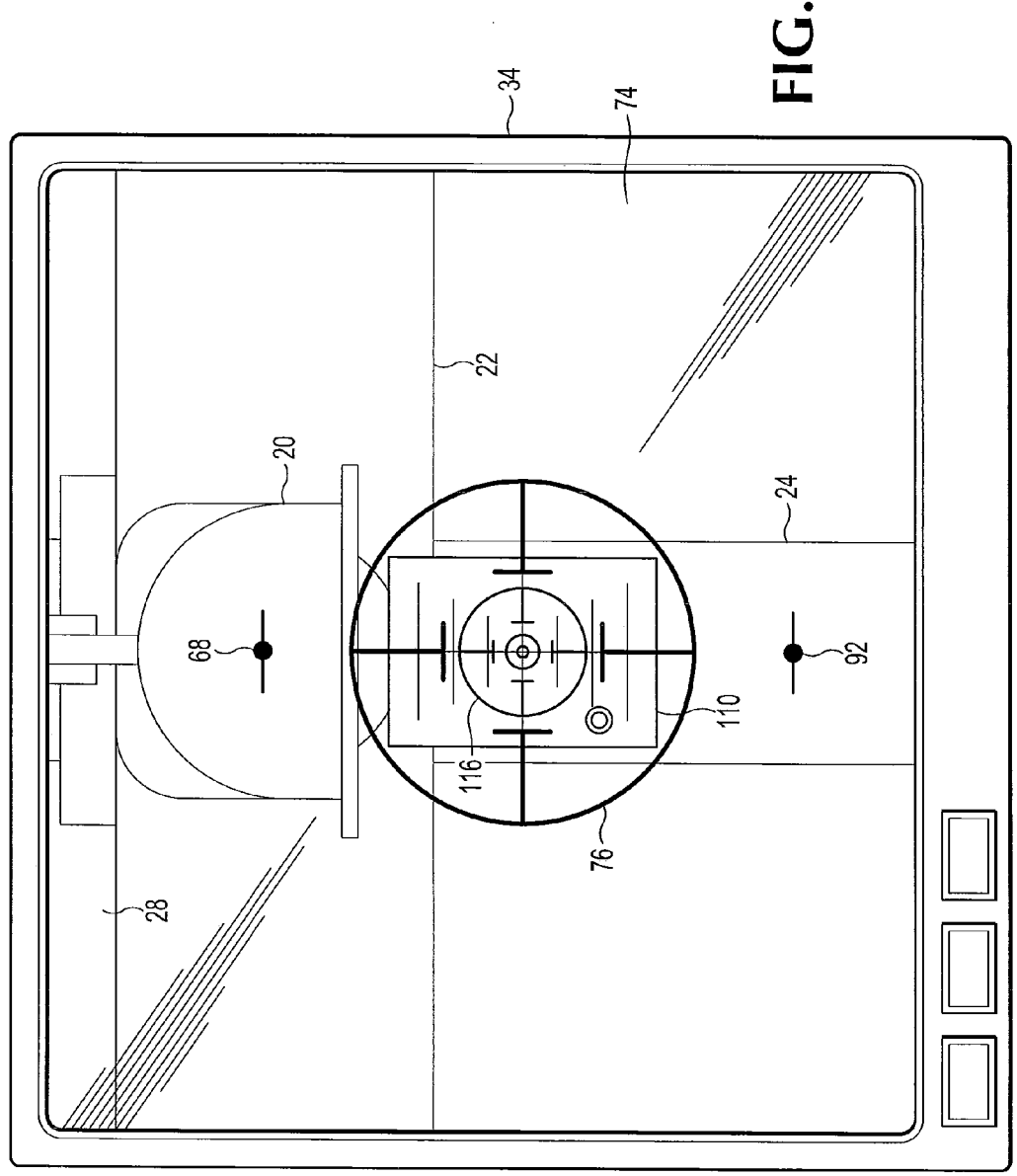

FIG. 10 is a view similar to FIG. 9, with the display monitor screen showing the image produced and transmitted by the camera with the towing vehicle approaching the trailer more closely.

Figure 5:
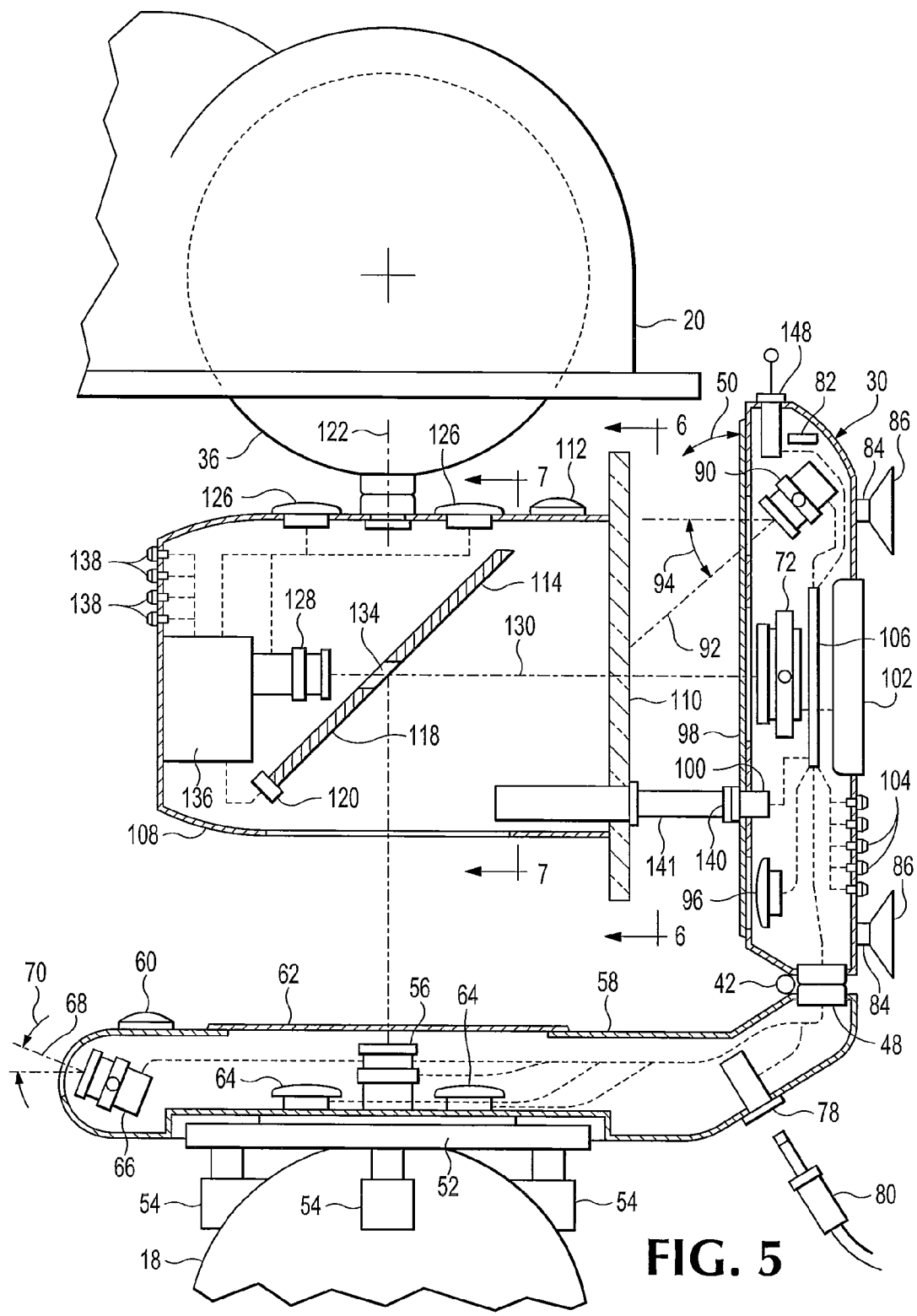
FIG. 5 is a partially sectional and simplified side view taken in the direction of line 5-5 in FIG. 2, showing a towing vehicle-mounted module of the hitch alignment facilitating apparatus shown in FIGS. 2, 3, and 4, mounted on a trailer hitch ball, as well as a trailer-mounted module of the apparatus and a coupler portion of a trailer hitch, with the coupler aligned with the trailer hitch ball.
Figure 11:
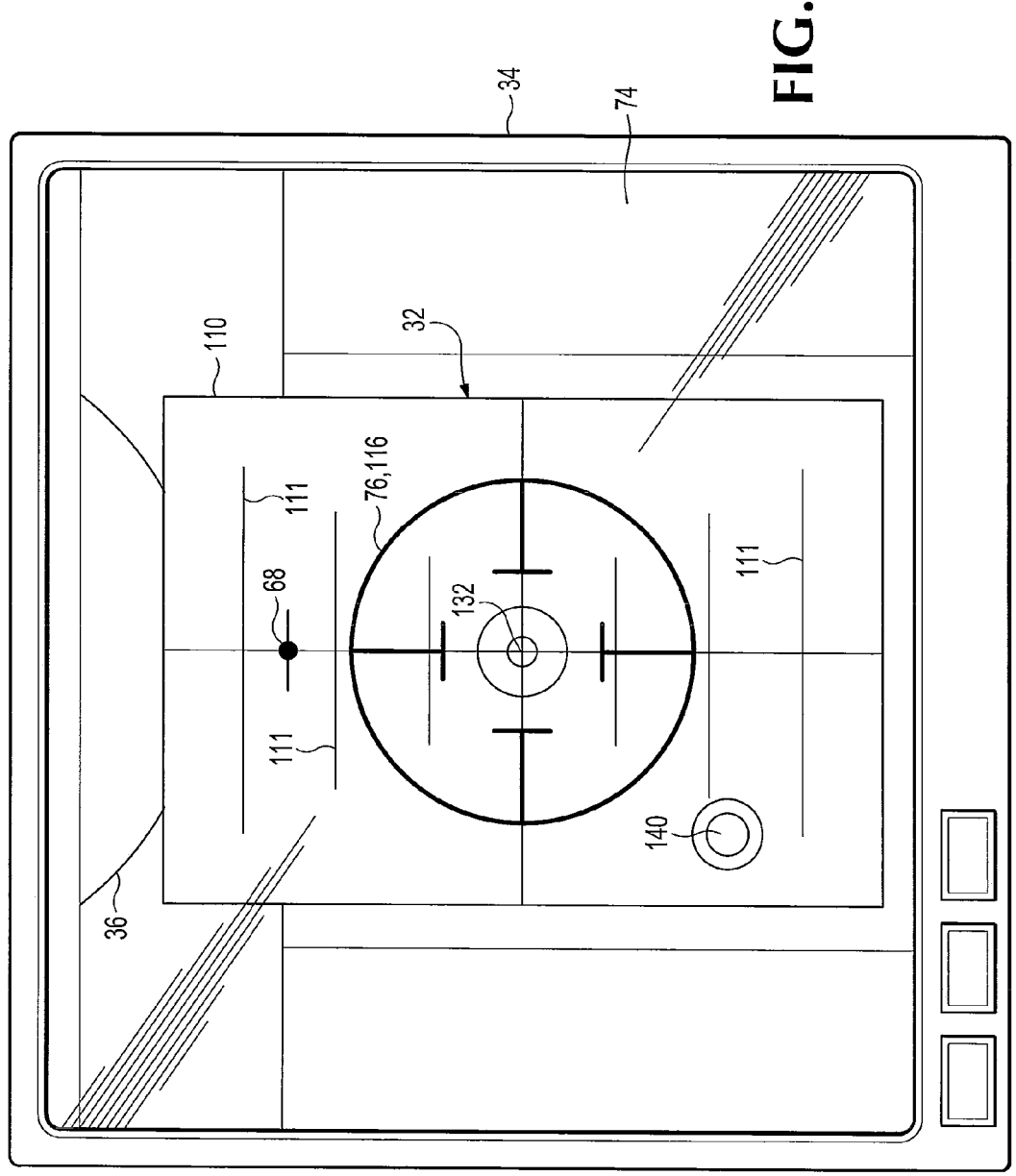

FIG. 11 is a view of the camera image shown in the display monitor in the towing vehicle operator's view when the towing vehicle is within a few inches from the hitch-mating position with respect to the trailer represented in FIG. 5.

Figure 12:
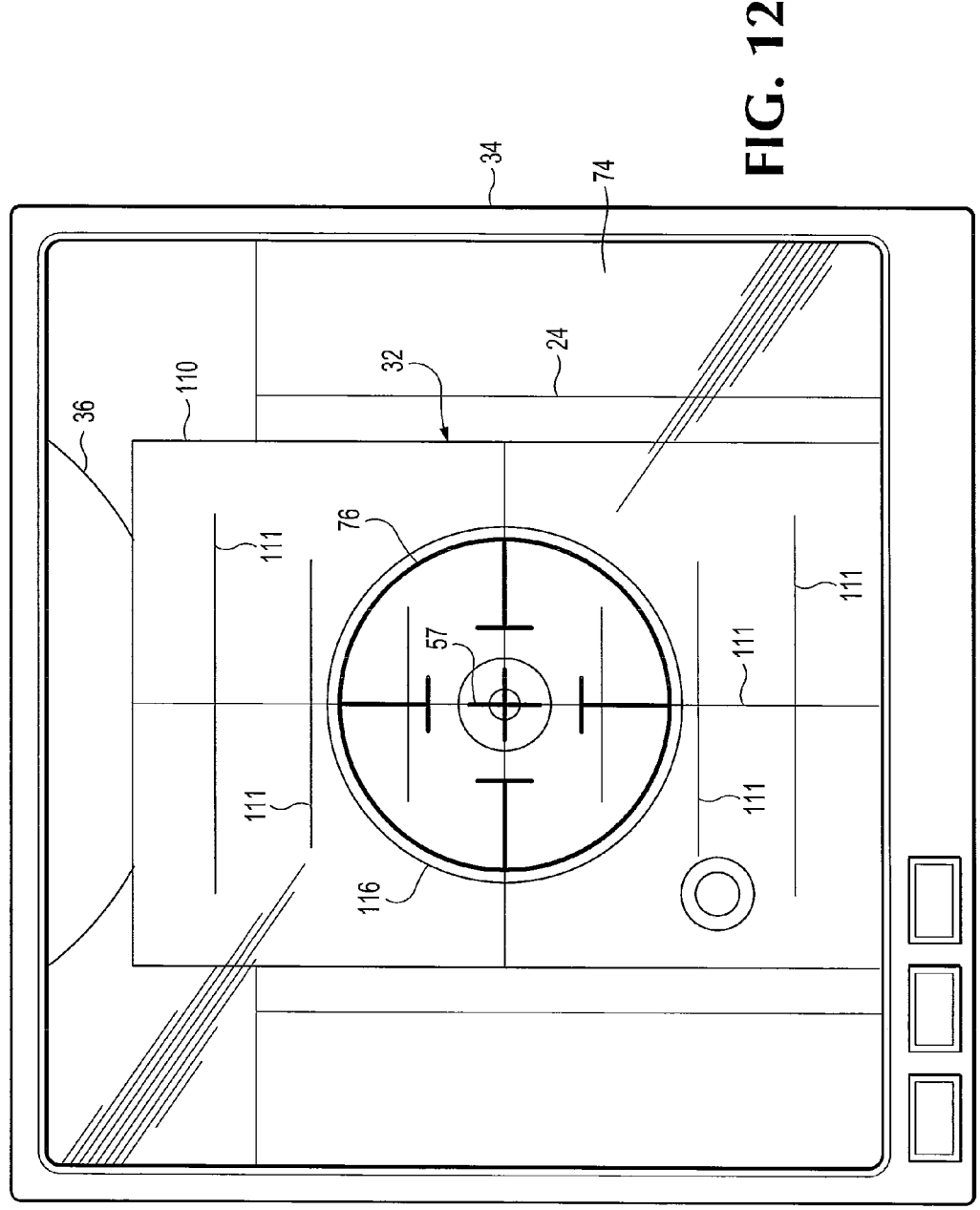

FIG. 12 is a view of the camera image shown in the display monitor in the towing vehicle operator's view when the towing vehicle and trailer are in the respective positions represented in FIG. 5.

Figure 13:
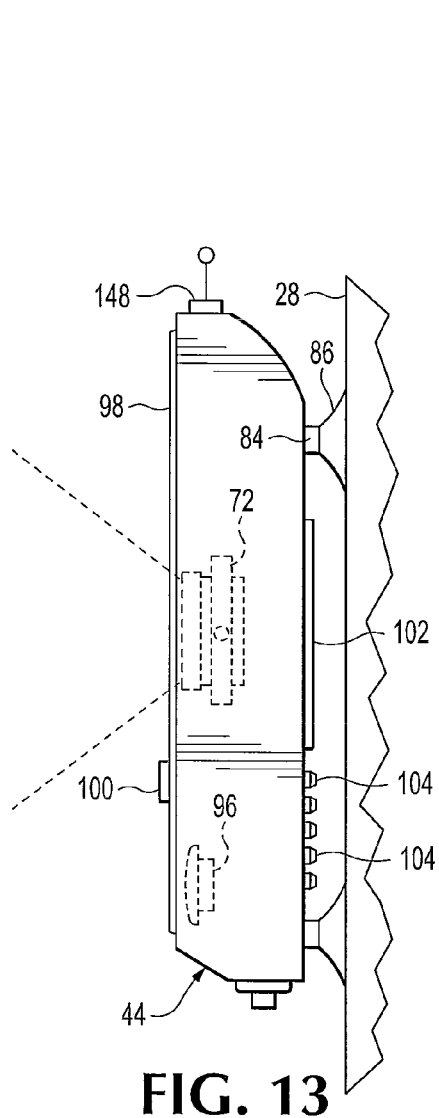

FIG. 13 is a view showing a portion of the towing vehicle-mounted module of the hitch alignment facilitating apparatus mounted on the rear of a trailer.

Figure 14:
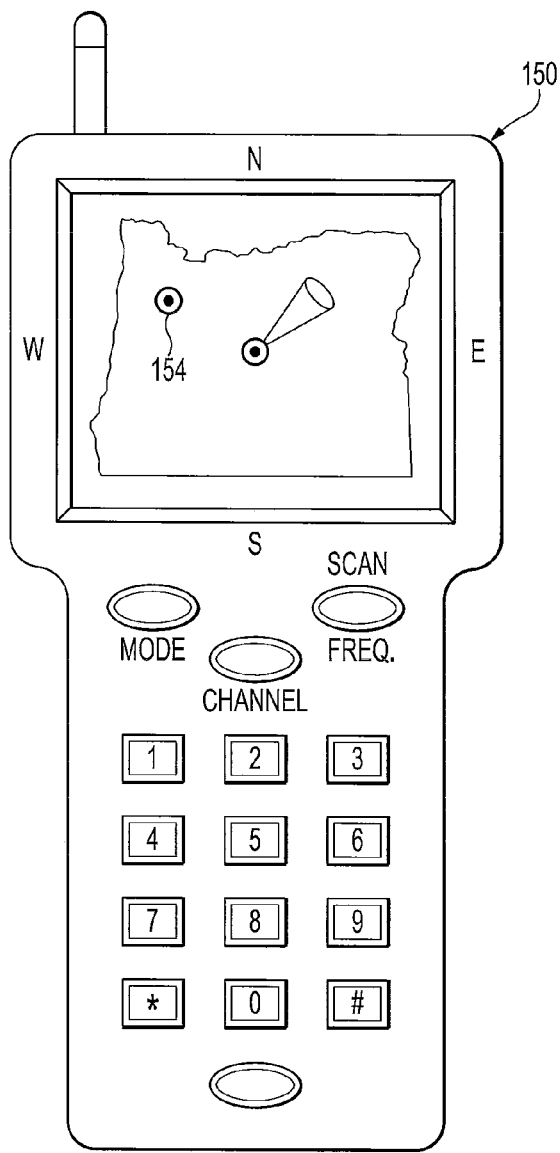

FIG. 14 is a simplified view of a hand-held separate module including a mobile telephone and a display showing an image transmitted by the camera in the towing vehicle module, similar to the image shown in FIG. 11.

Figure 15:
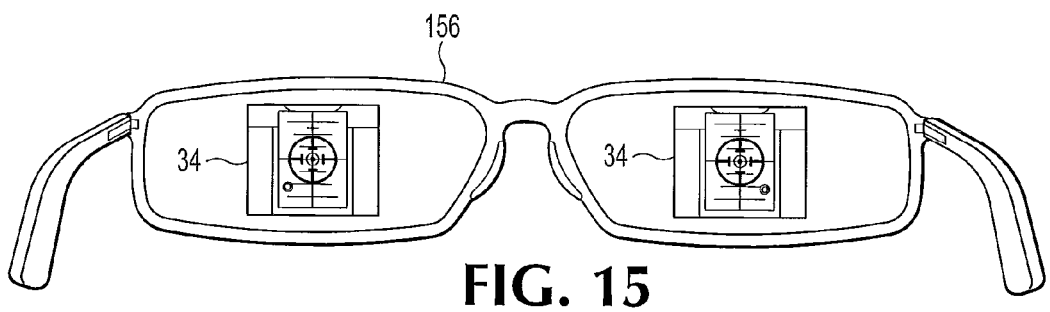

FIG. 15 is a perspective view of a display device showing a pair of displays of the image transmitted by the camera in the towing vehicle module, in a device similar to a pair of glasses.

Figure 16:
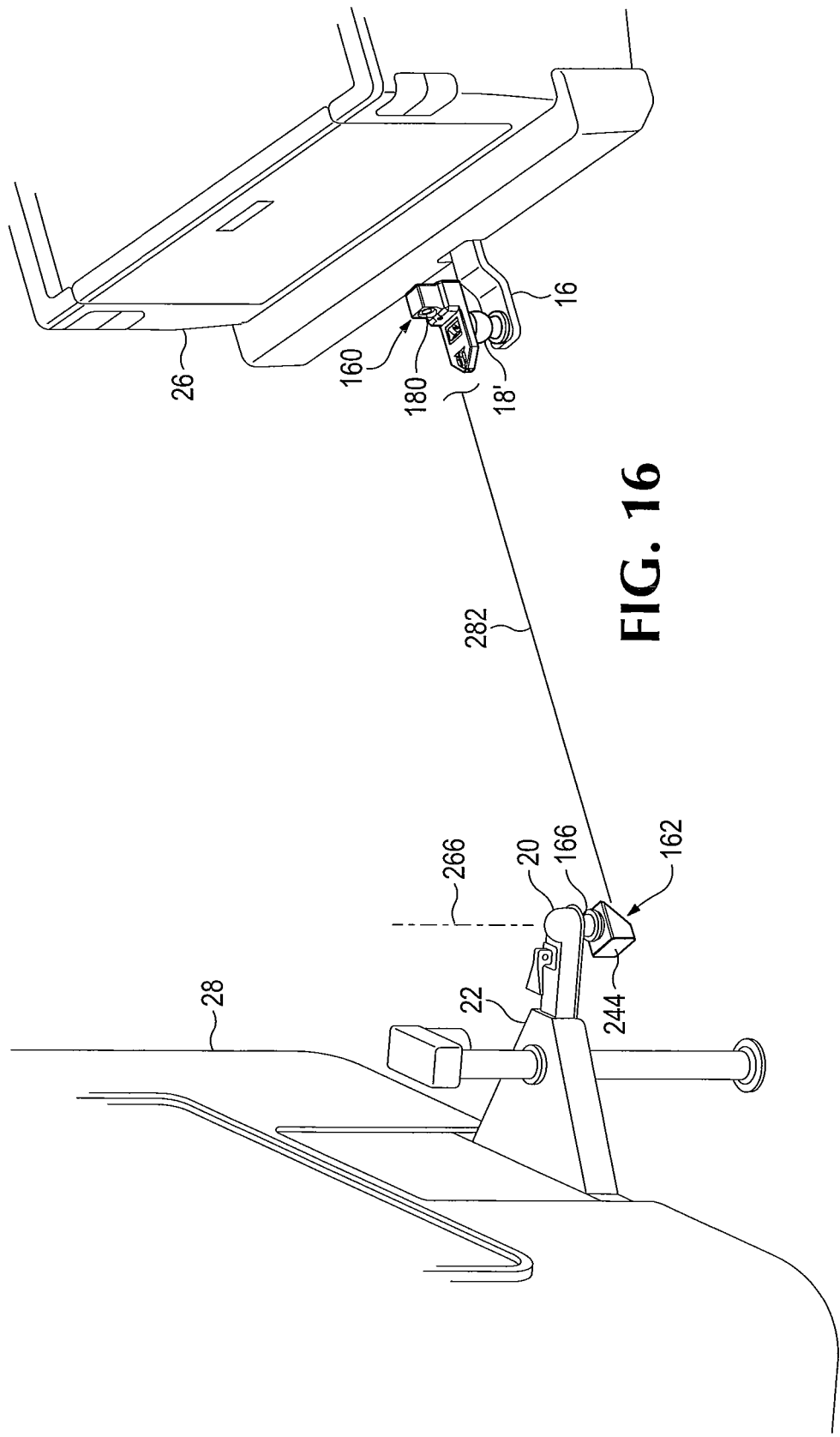

FIG. 16 is an isometric partial view of a rear end of a towing vehicle and a front end of a trailer equipped with the another embodiment of a hitch alignment guidance apparatus, with the towing vehicle in an initial position with respect to the trailer, in preparation for backing the towing vehicle toward the trailer in order to hitch the trailer to the towing vehicle.

Figure 17:
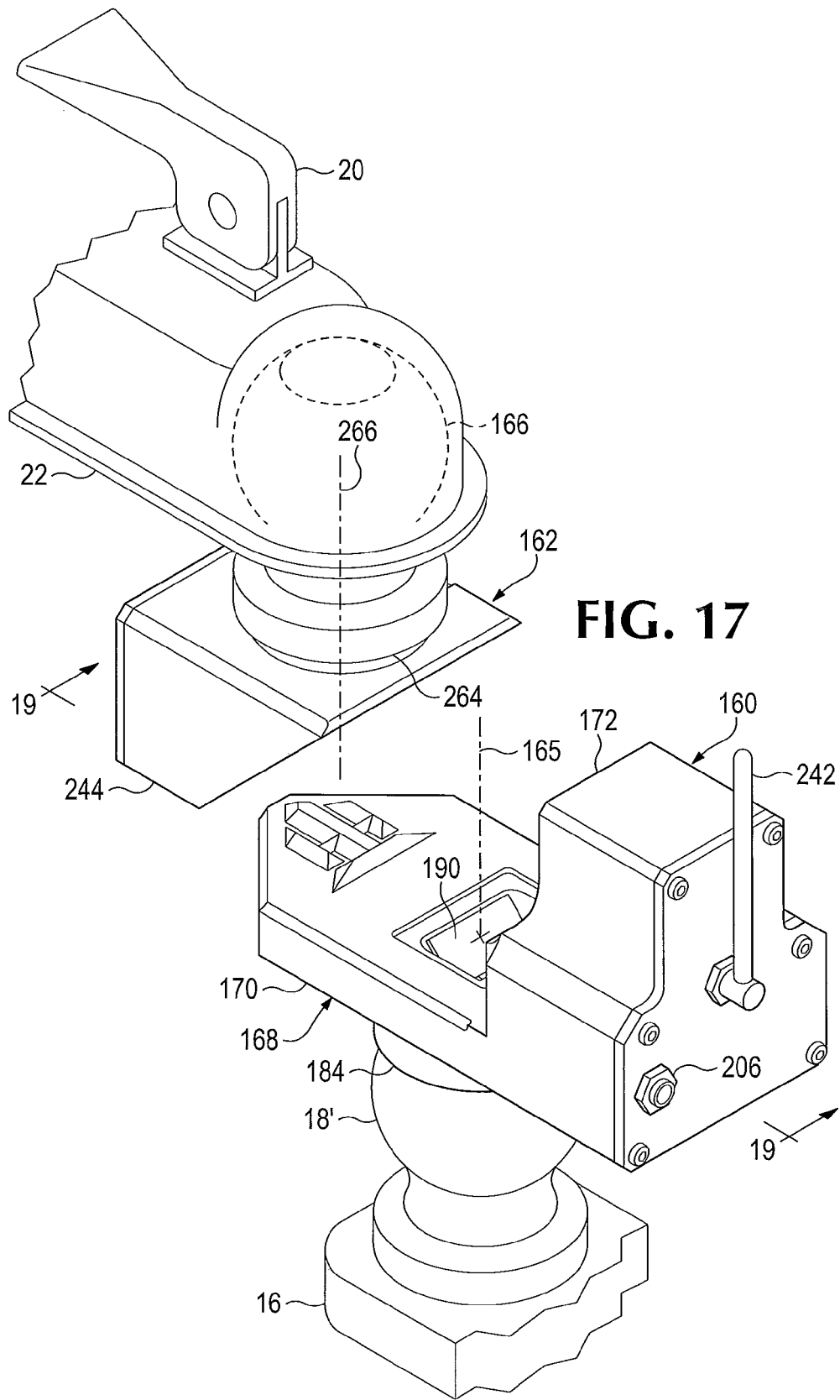

FIG. 17 is an isometric view, at an enlarged scale, of the trailer hitch ball and a portion of the trailer tongue shown in FIG. 16, with modules of the hitch alignment facilitating apparatus mounted on the trailer tongue and the hitch ball of the trailer hitch.

Figure 18:
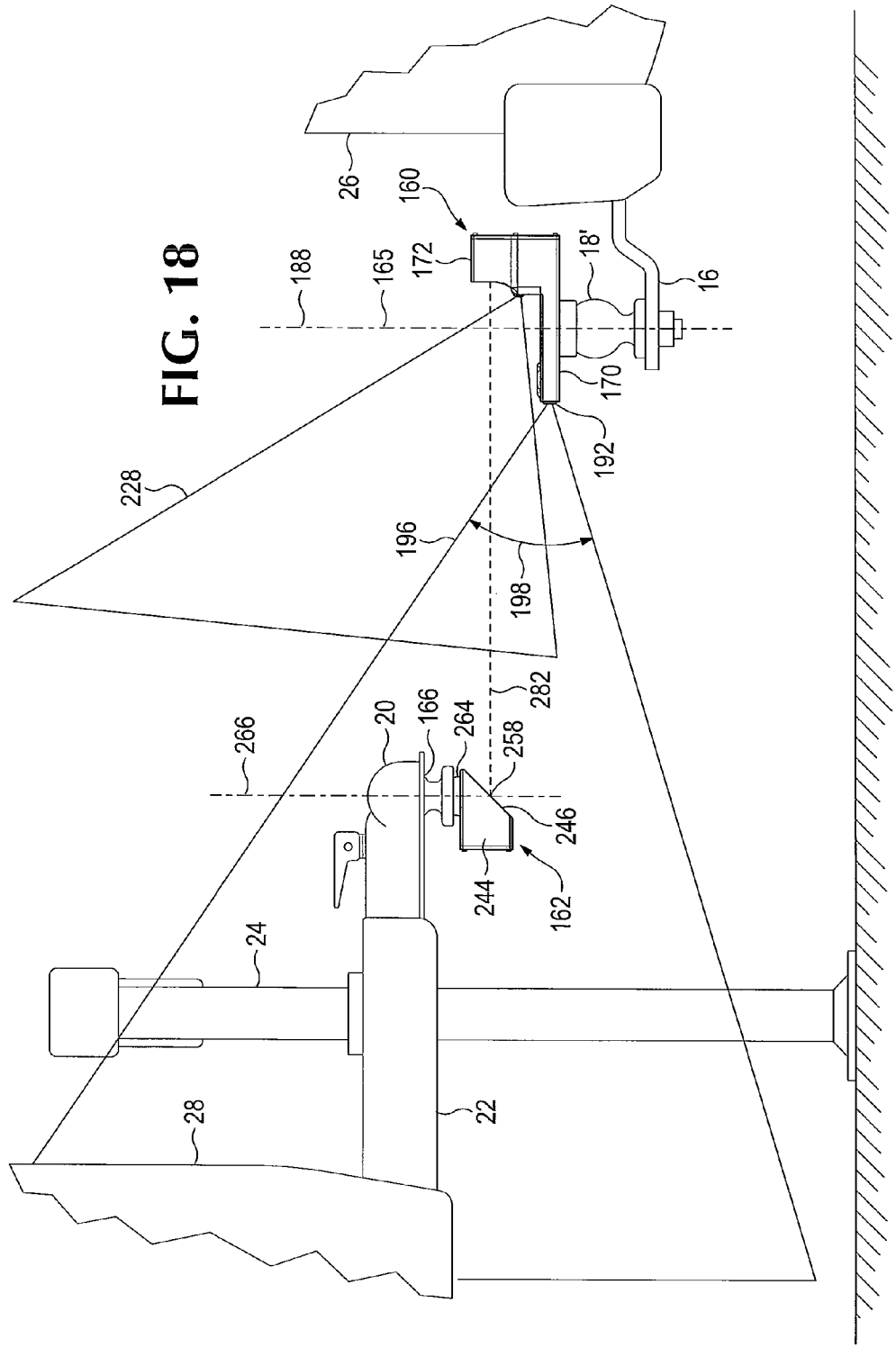

FIG. 18 is a side elevational view of parts of the trailer and towing vehicle shown in FIGS. 16 and 17, showing the towing vehicle and trailer-mounted modules of the hitch-alignment facilitating apparatus in their operative positions.

Figure 19:
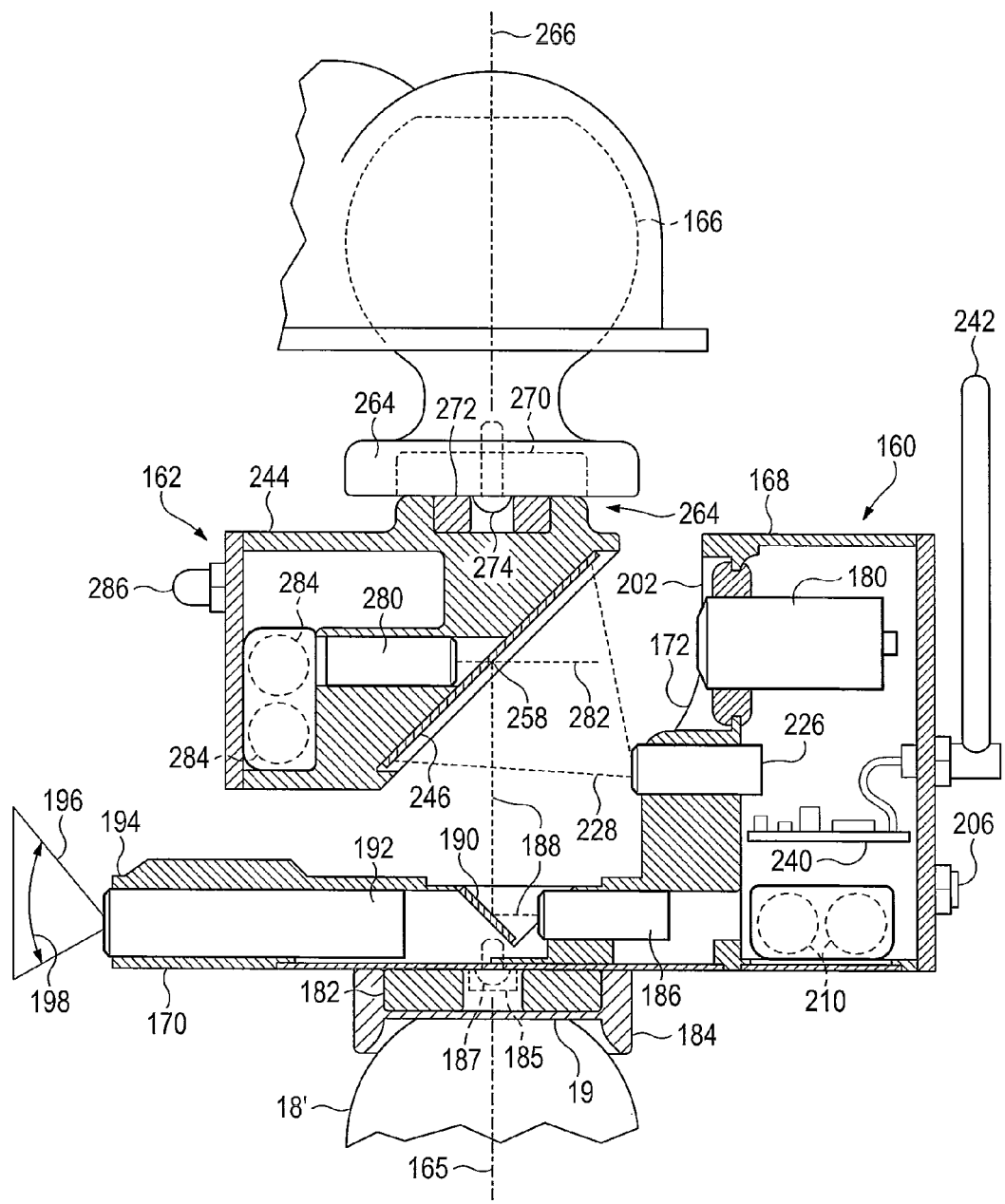

FIG. 19 is a sectional side view at an enlarged scale, taken in the direction of line 19-19 in FIG. 17, showing a towing vehicle-mounted module of the hitch alignment facilitating apparatus shown in FIGS. 16, 17, and 18 mounted on a trailer hitch ball, as well as a trailer-mounted module of the apparatus and a coupler portion of a trailer hitch, with the coupler aligned with the trailer hitch ball.

Figure 20:
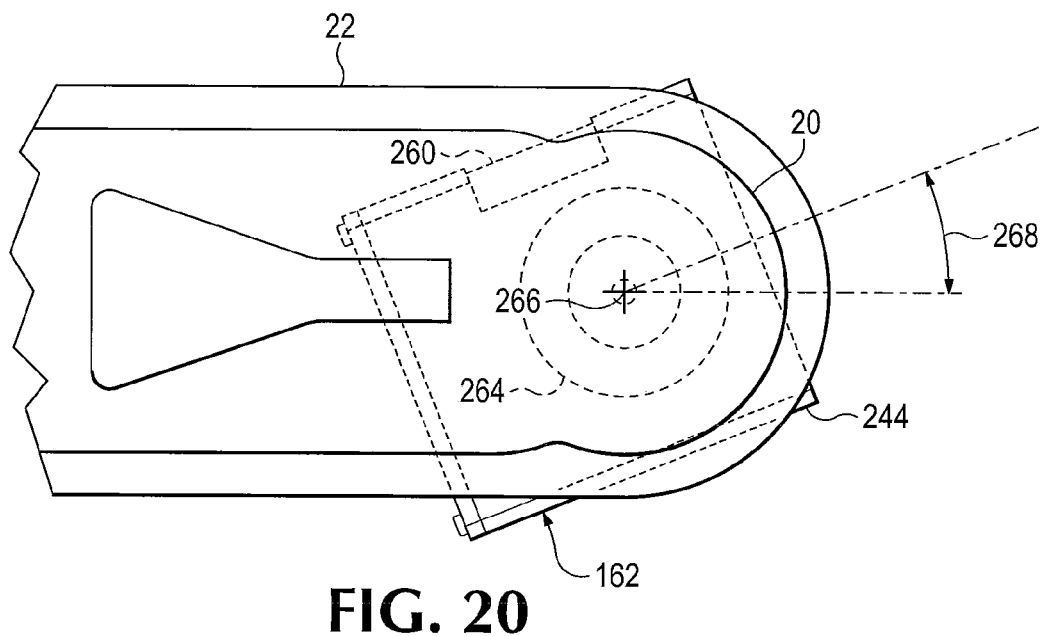

FIG. 20 is a top plan view of a portion of the trailer tongue and the trailer-mounted module shown in FIG. 19.

Figure 21:
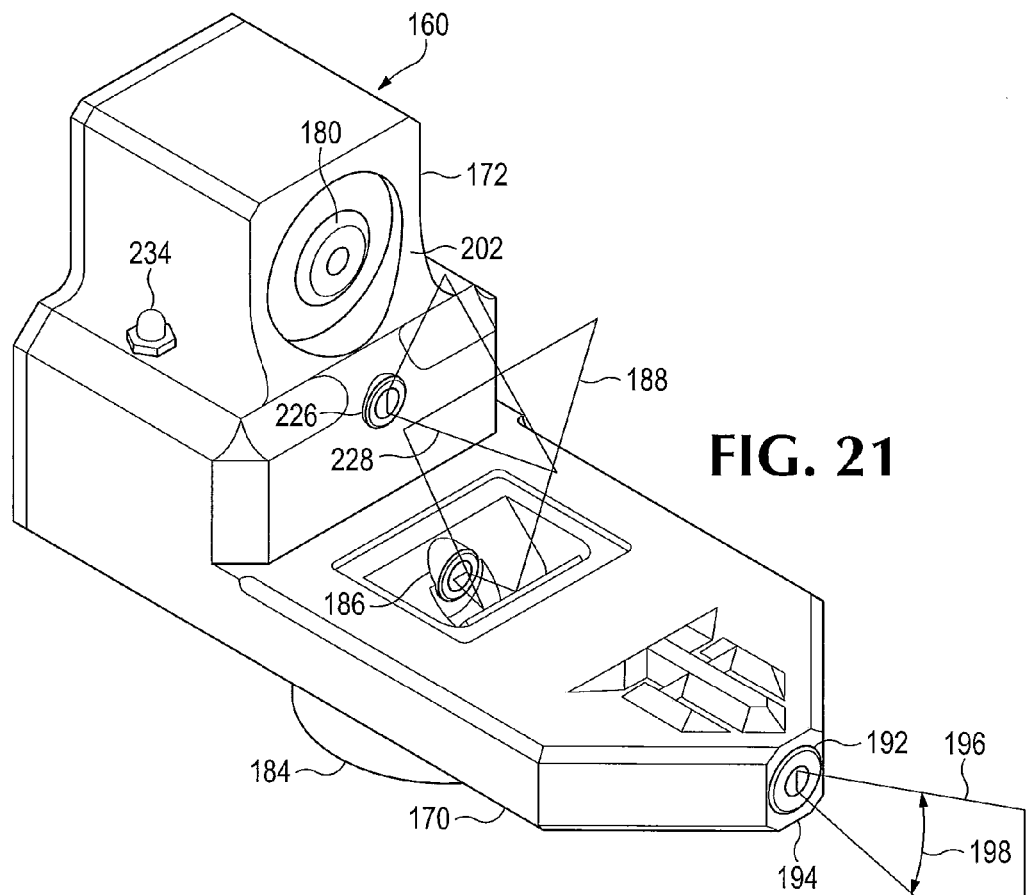

FIG. 21 is an isometric view from the upper left rear of the towing vehicle-mounted module shown in FIGS. 16-19.

Figure 22:
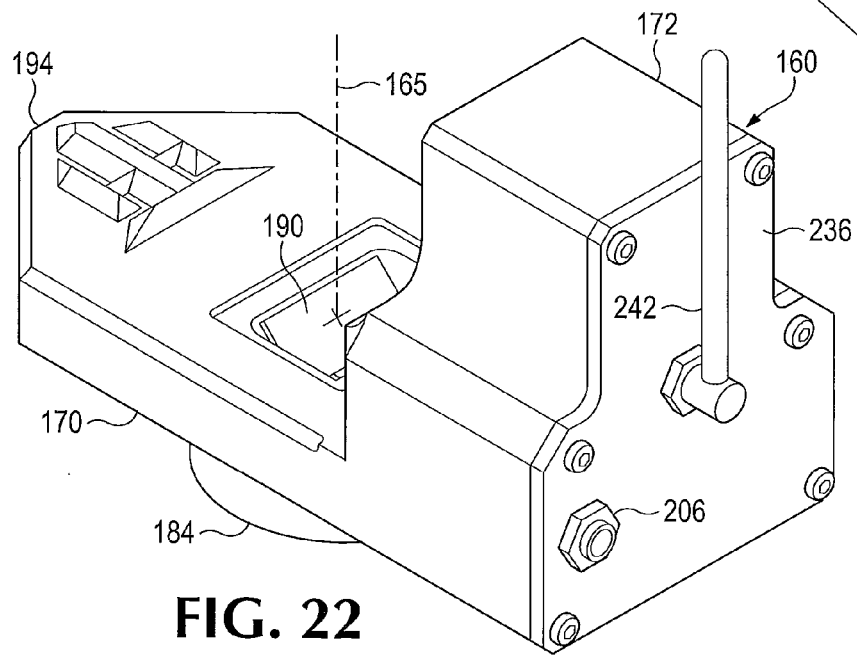

FIG. 22 is an isometric view from the upper right front of the towing vehicle-mounted module shown in FIG. 21.

Figure 23:
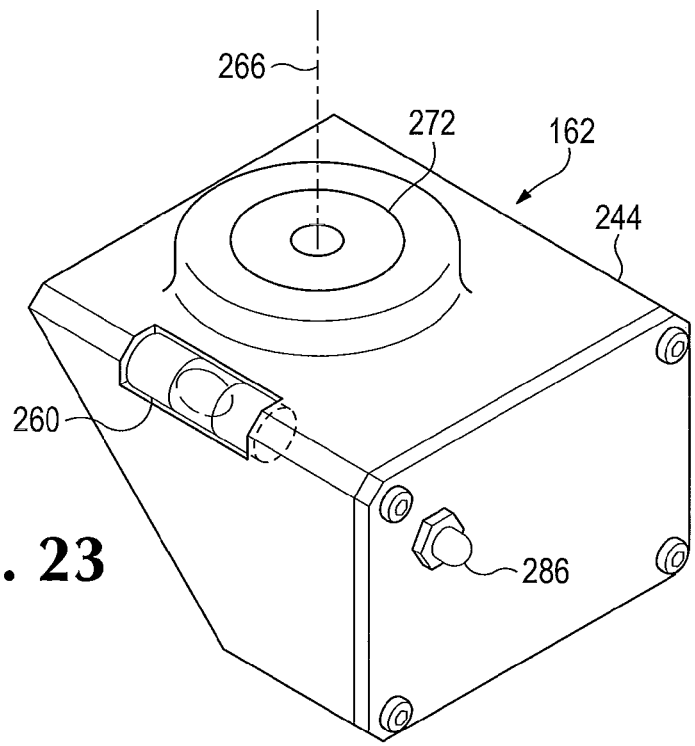

FIG. 23 is an isometric view from the upper left rear of the body of the trailer-mounted, or target, module shown in FIGS. 16-20.

Figure 24:
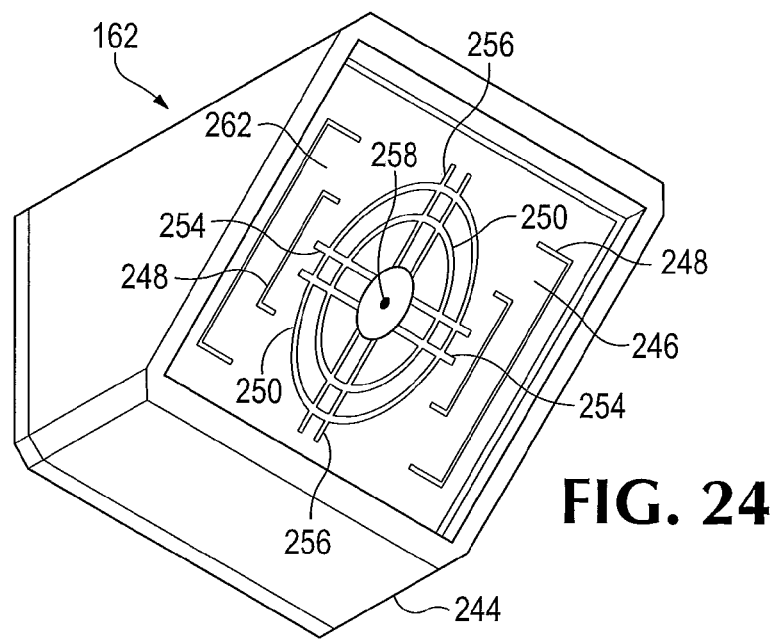

FIG. 24 is an isometric view taken from the lower right front of the trailer-mounted module shown in FIG. 23.

Figure 25:
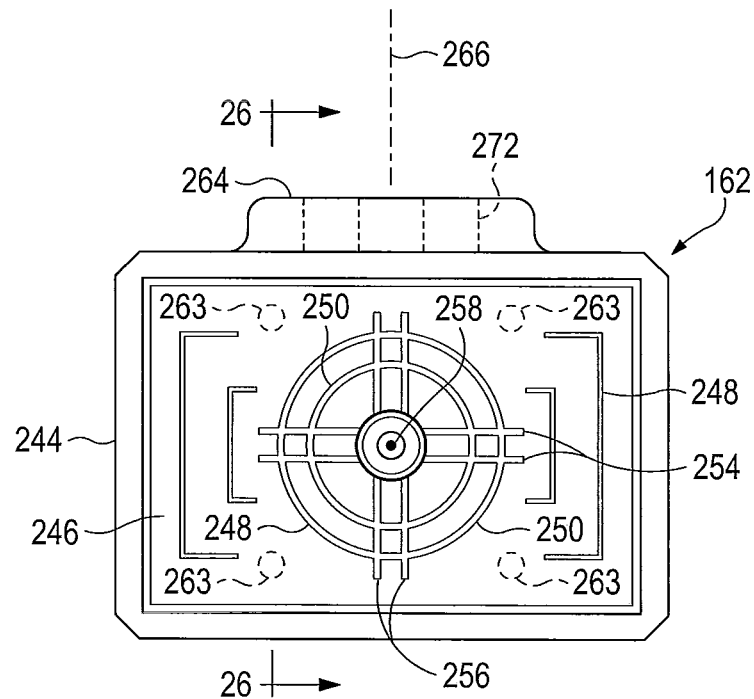

FIG. 25 is a front elevational view of the body of the trailer-mounted module shown in FIGS. 23 and 24.

Figure 26:
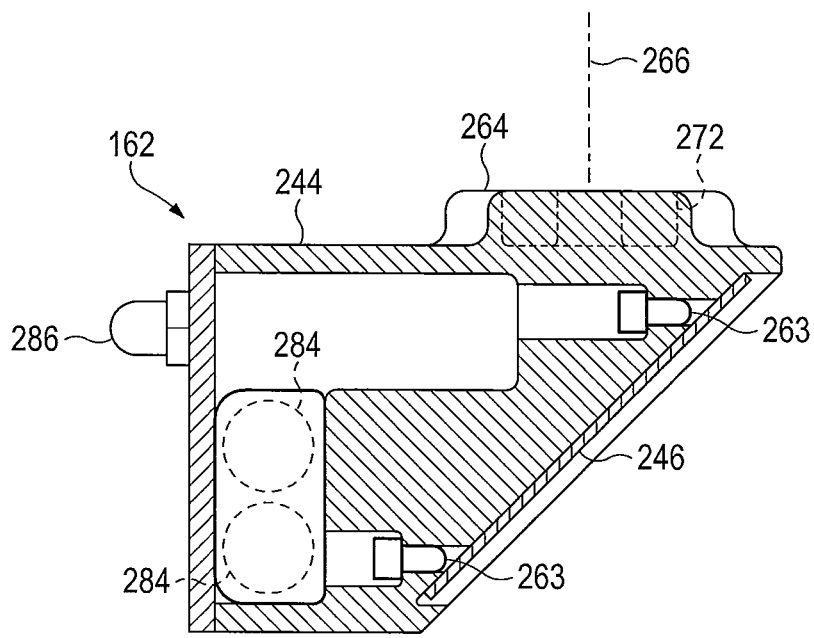

FIG. 26 is a sectional view taken along line 26-26 in FIG. 25.

Figure 27:
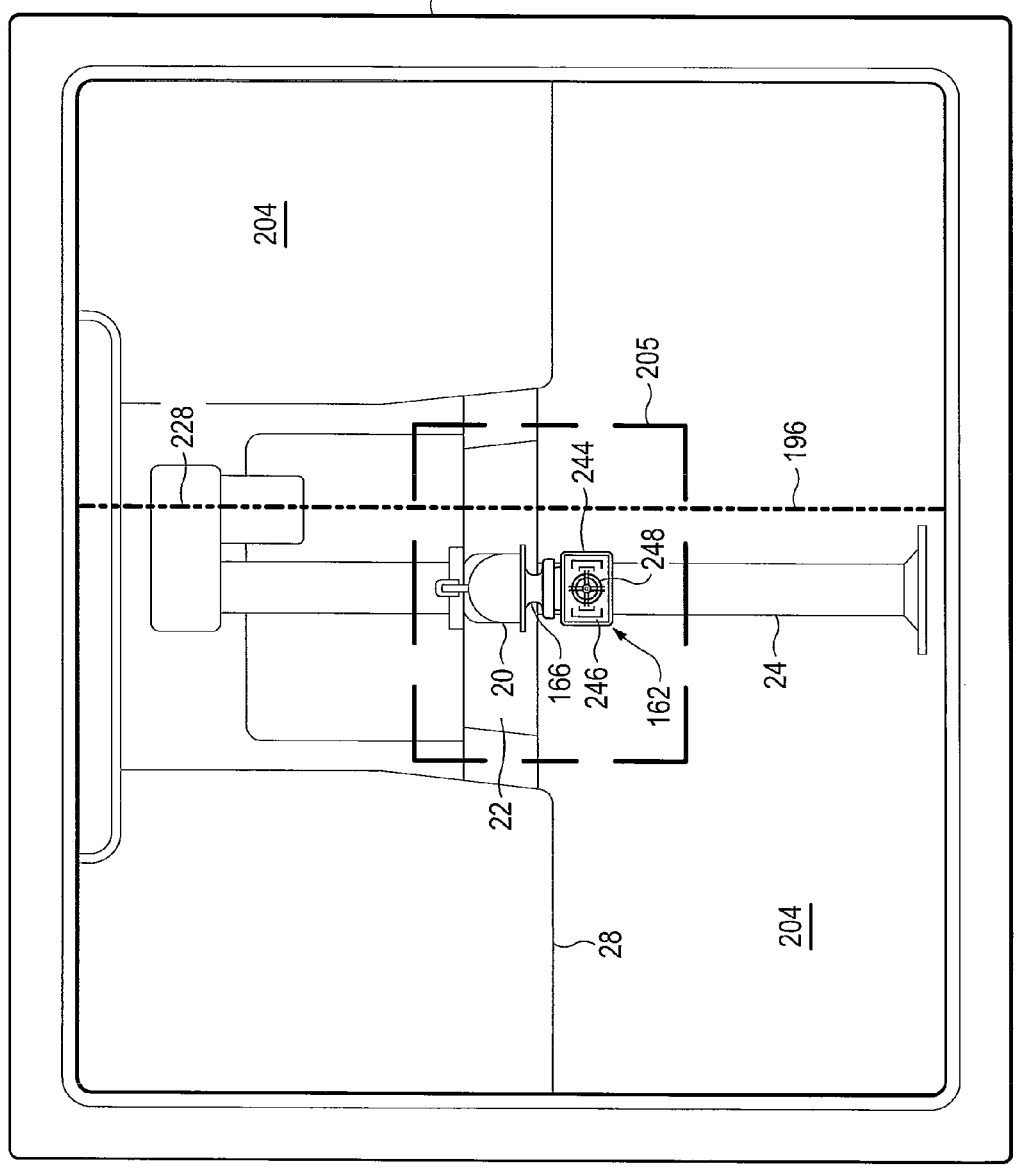

FIG. 27 is a view of a display monitor screen located within the towing vehicle in position for viewing by the towing vehicle operator and displaying an image transmitted by a video camera portion of the towing vehicle module of the hitch-alignment facilitating apparatus shown in FIGS. 16-19 with the towing vehicle ahead of the trailer as represented in FIG. 18.

Figure 28:
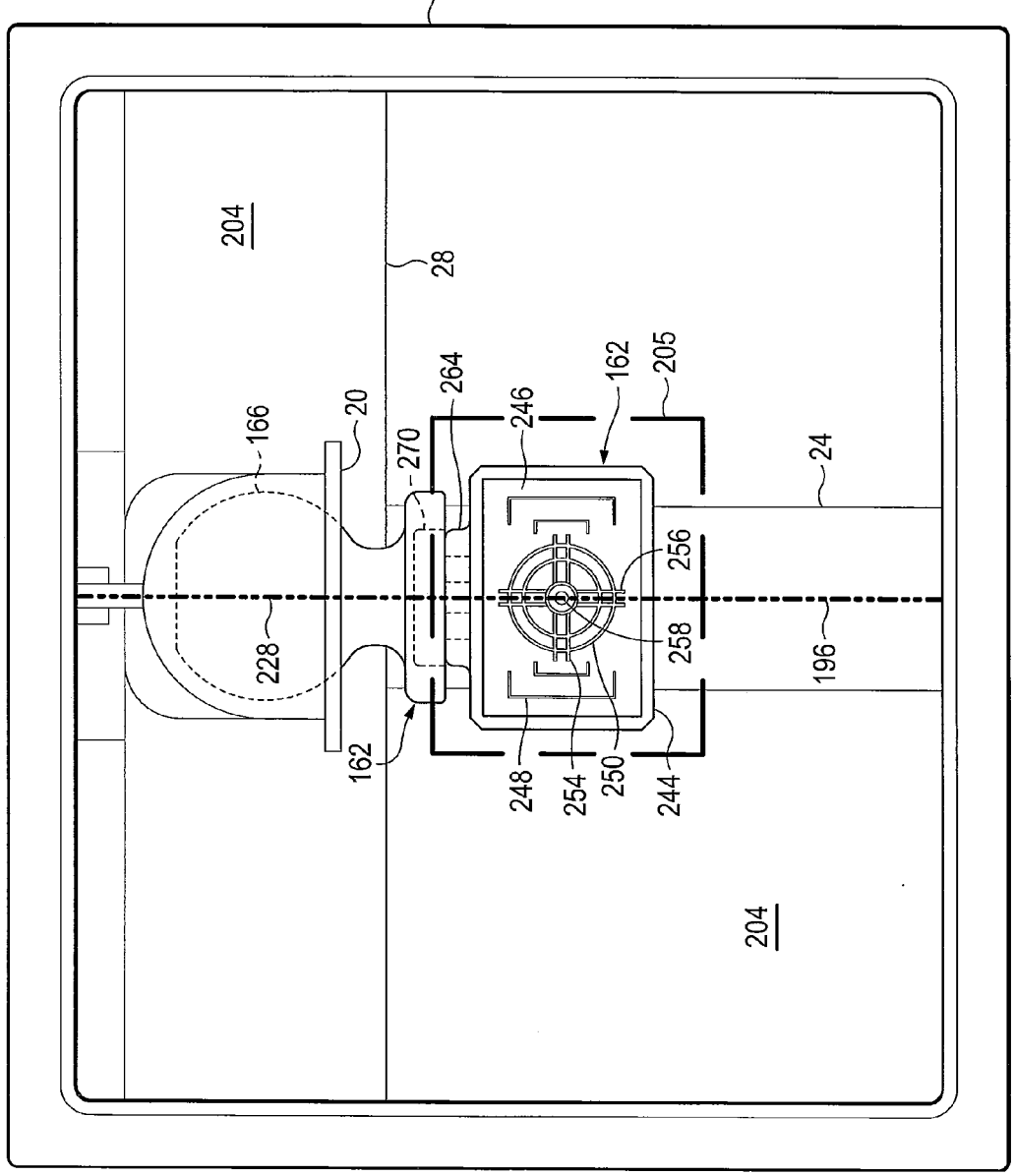

FIG. 28 is a view similar to FIG. 27, with the display monitor screen showing the image produced and transmitted by the camera of the hitch-alignment facilitating apparatus with the towing vehicle backed more closely toward the trailer.

Figure 29:
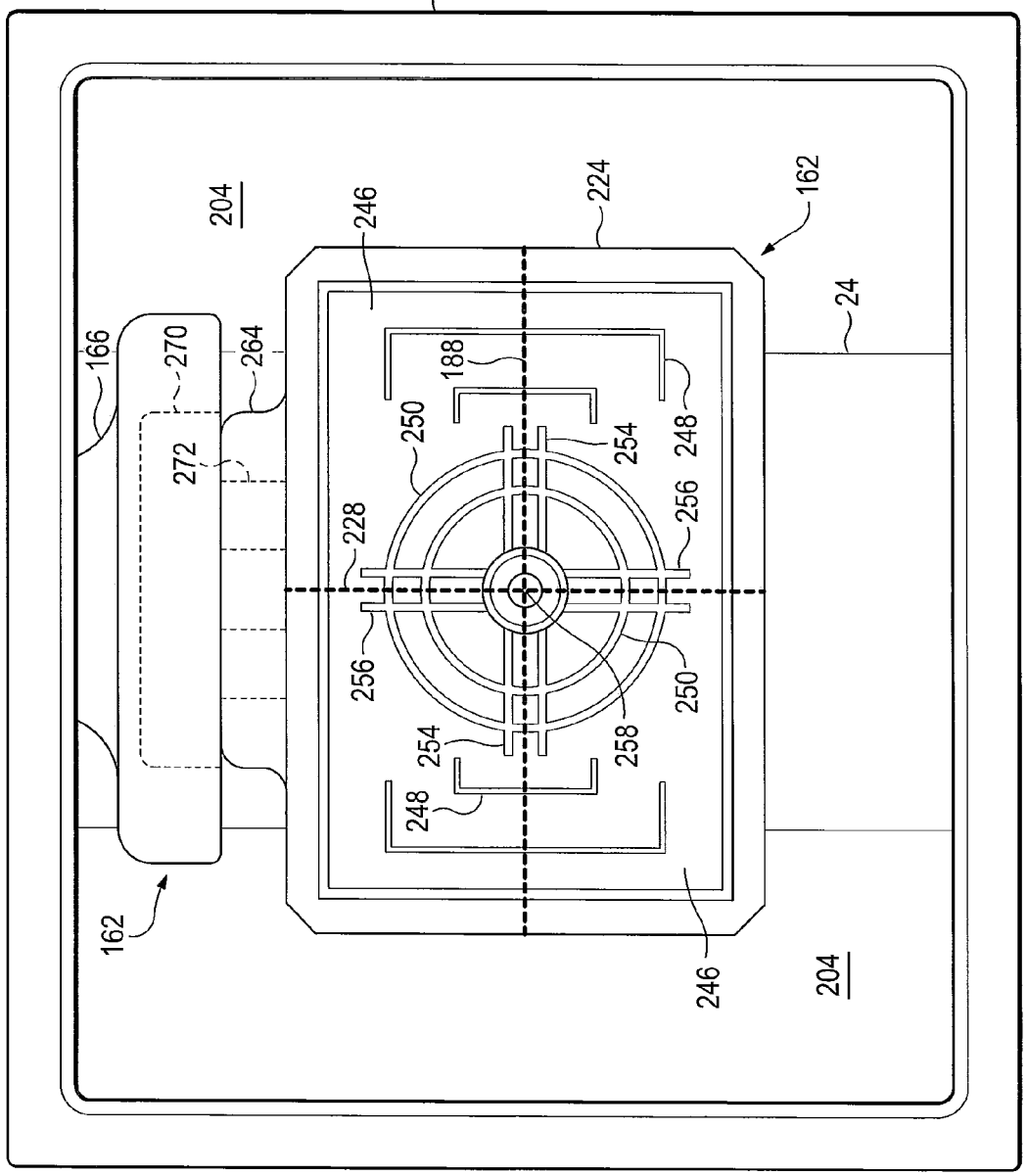

FIG. 29 is a view of the camera image shown in the display monitor shown in FIGS. 27 and 28 when the towing vehicle and trailer are in the respective positions represented in FIG. 19.

Figure 30:
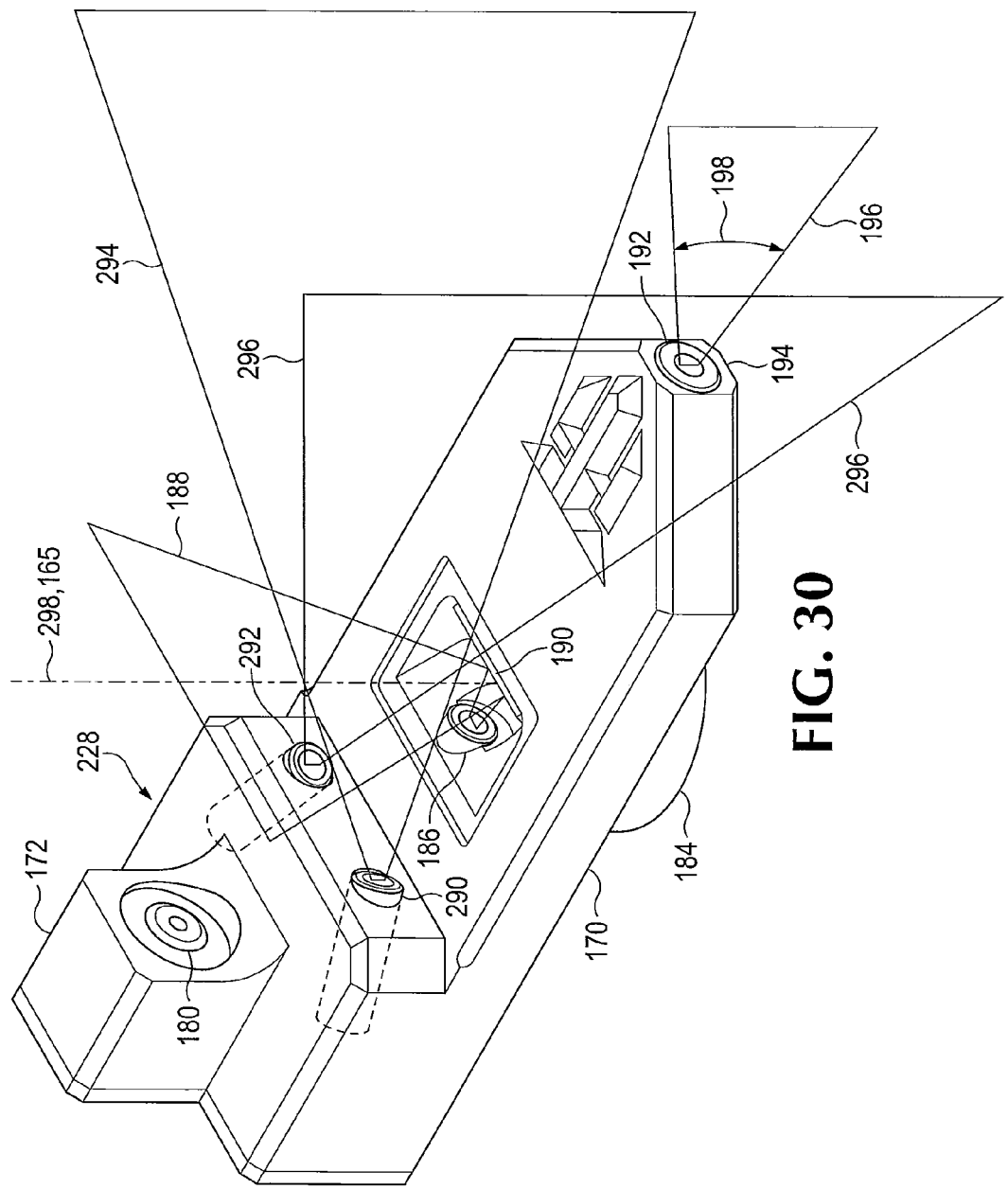

FIG. 30 is an isometric view from the upper left rear of a towing vehicle module which is another embodiment of the apparatus disclosed herein and which includes a pair of inwardly angulated light beam projectors.

Figure 31:
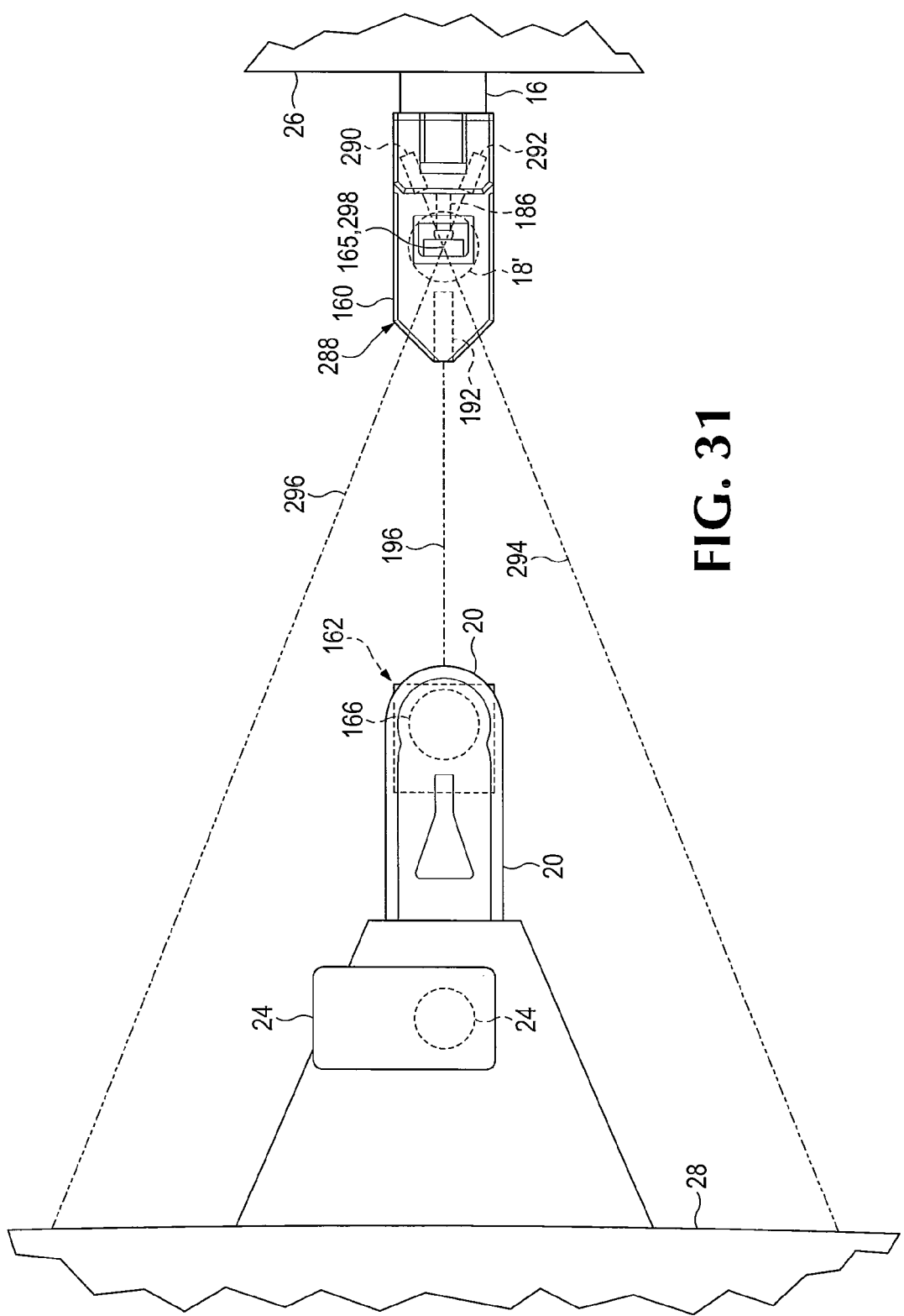

FIG. 31 is a diagrammetric plan view of the towing vehicle module shown in FIG. 30 mounted on a trailer hitch ball of a towing vehicle located a short distance ahead of a trailer on which a trailer-mounted module is mounted.

Figure 32:
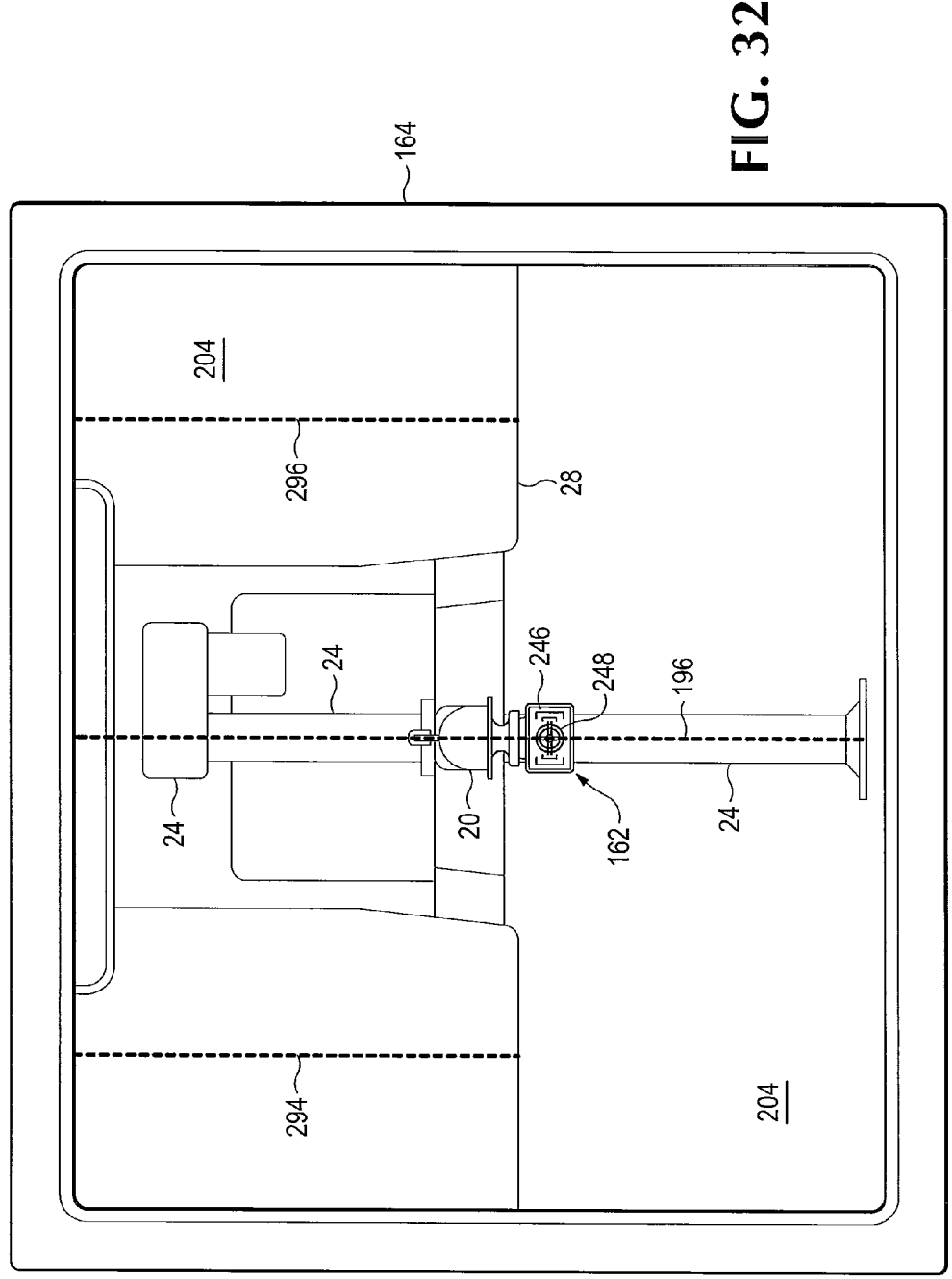

FIG. 32 is a view of a video monitor displaying an image transmitted from the video camera included in the towing vehicle-mounted module shown in FIG. 30, showing the trailer equipped with the trailer-module shown in FIGS. 19 and 23-26.

Figure 33:
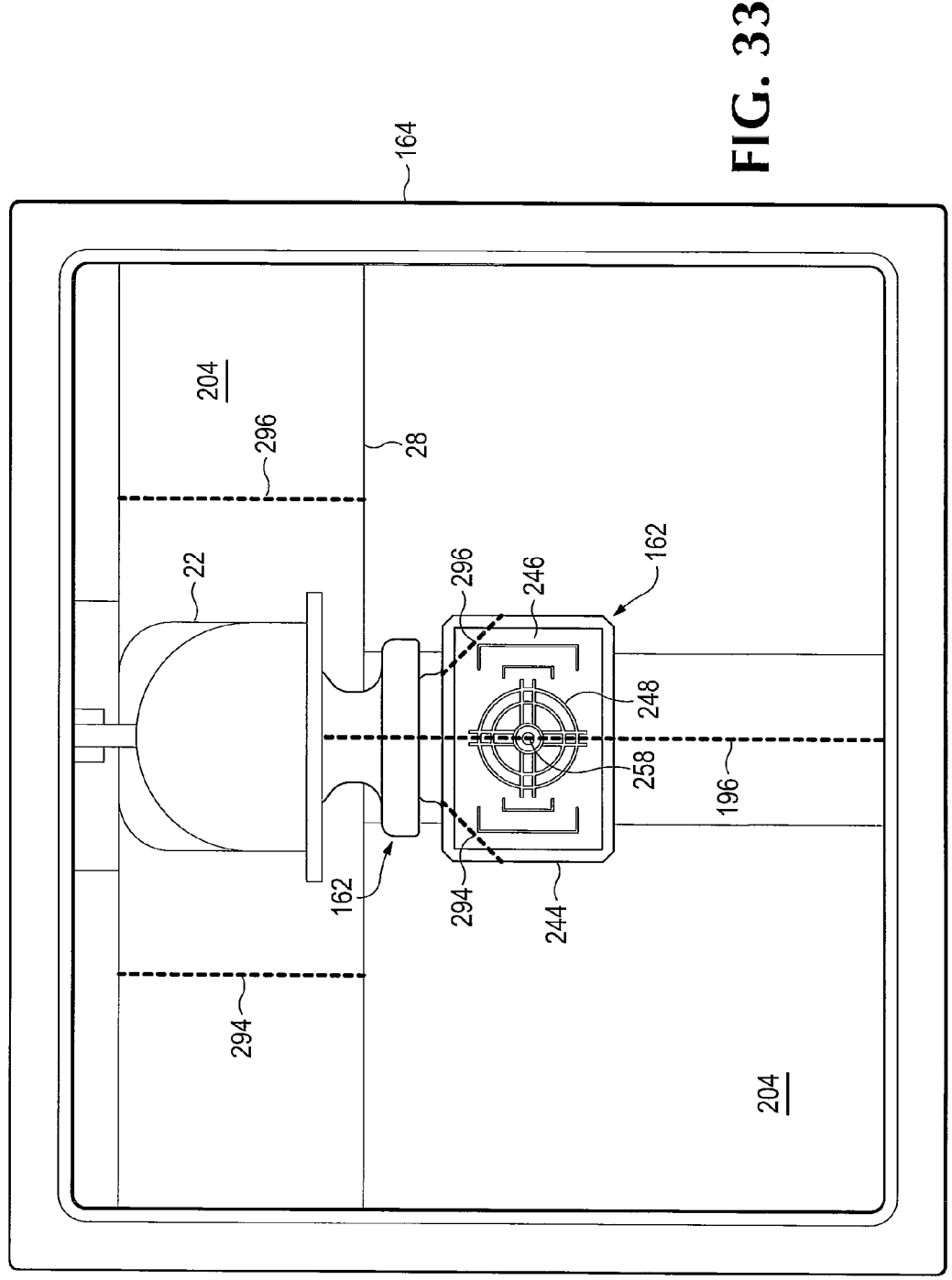

FIG. 33 is a view of the video monitor shown in FIG. 32, with the towing vehicle a very short distance ahead of the hitch mating location with respect to the trailer shown in FIGS. 31 and 32.

Figure 34:
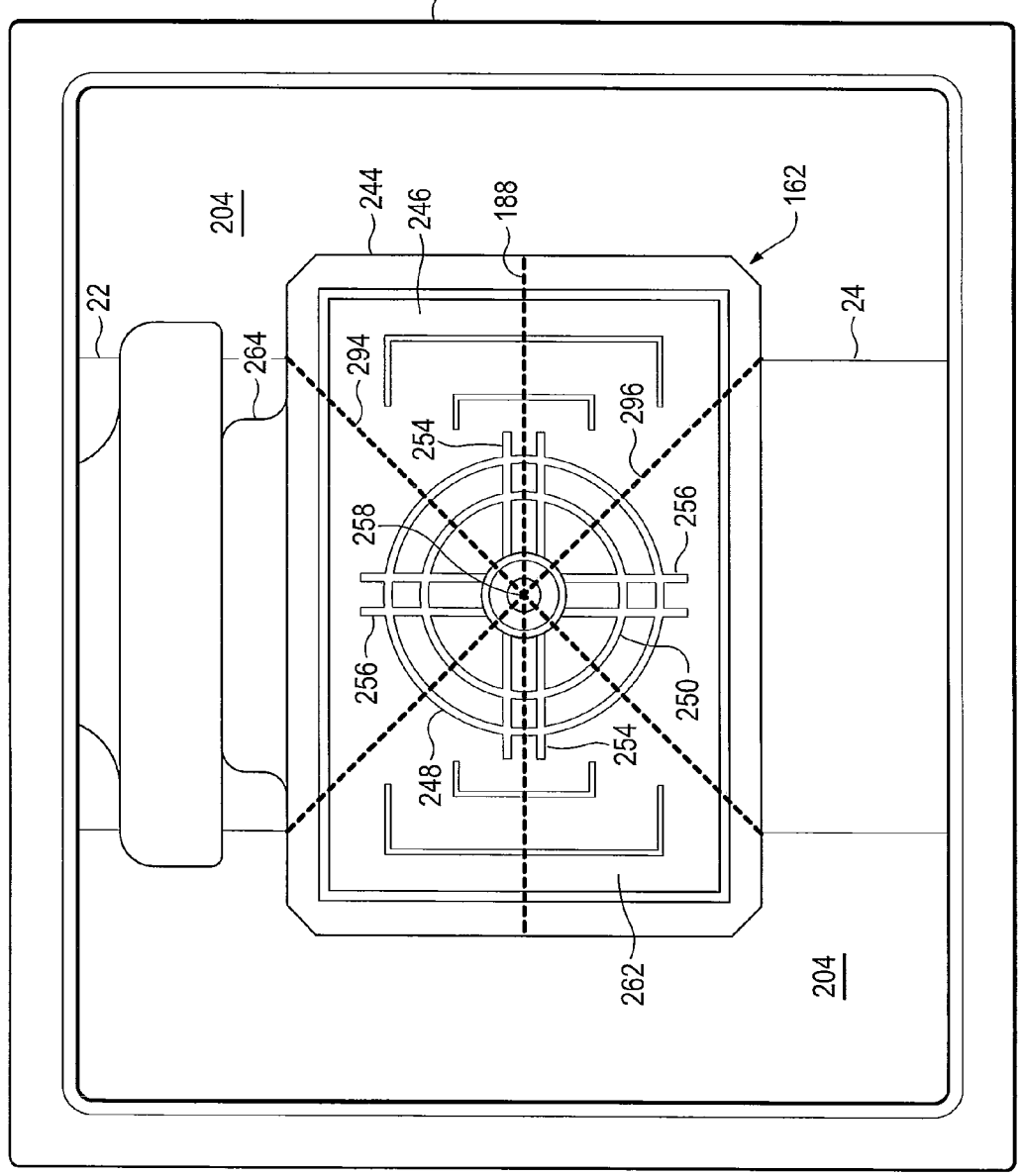

FIG. 34 is a view of the video monitor of the apparatus showing the image generated by a video camera in the towing vehicle-mounted module shown in FIG. 30 when the towing vehicle is in the hitch-mating position with respect to the trailer shown in FIG. 31.

Figure 35:
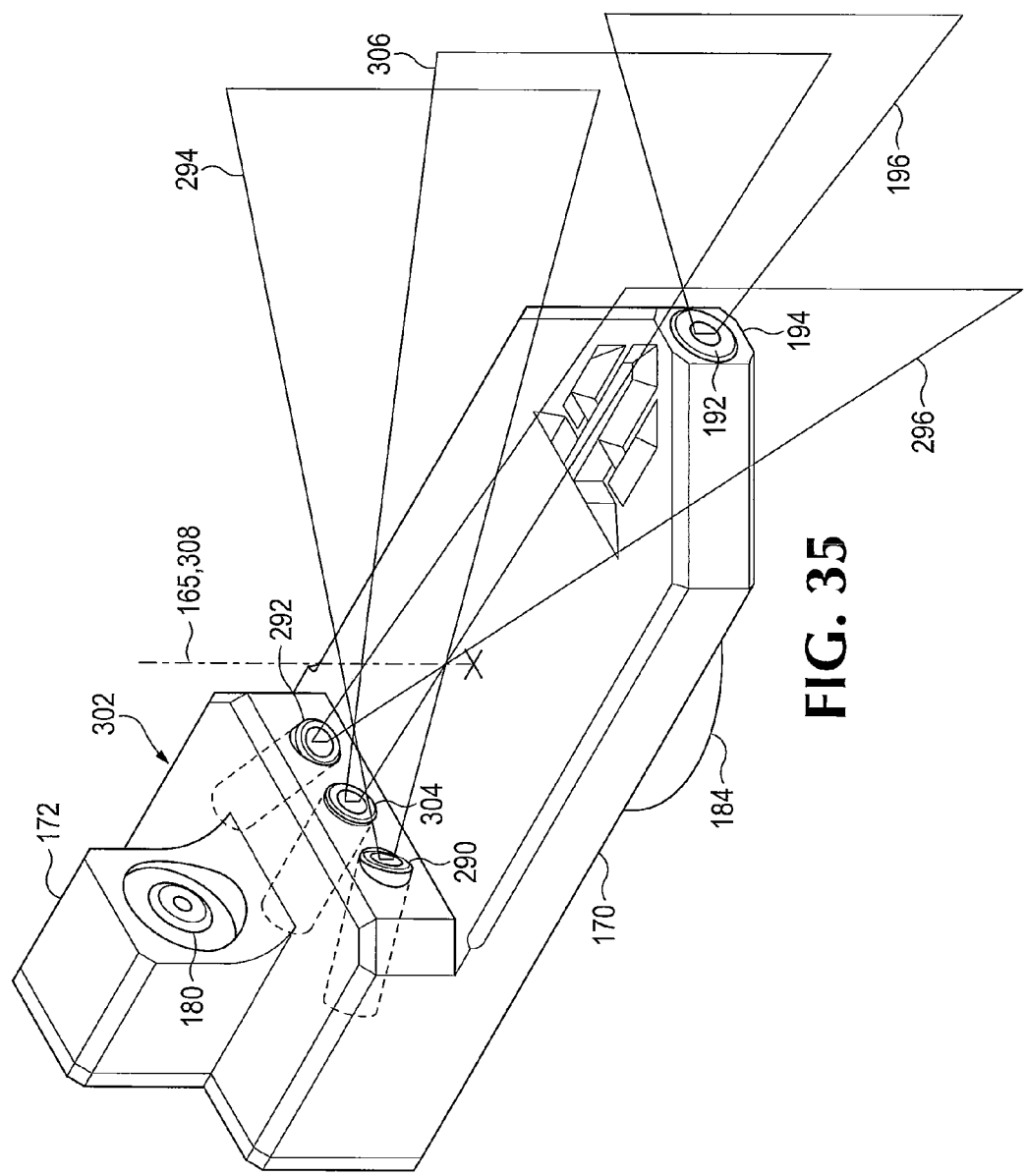

FIG. 35 is an isometric view from the upper left rear of another embodiment of a towing vehicle-mounted module for the hitch-alignment guidance apparatus disclosed herein.

Figure 36:
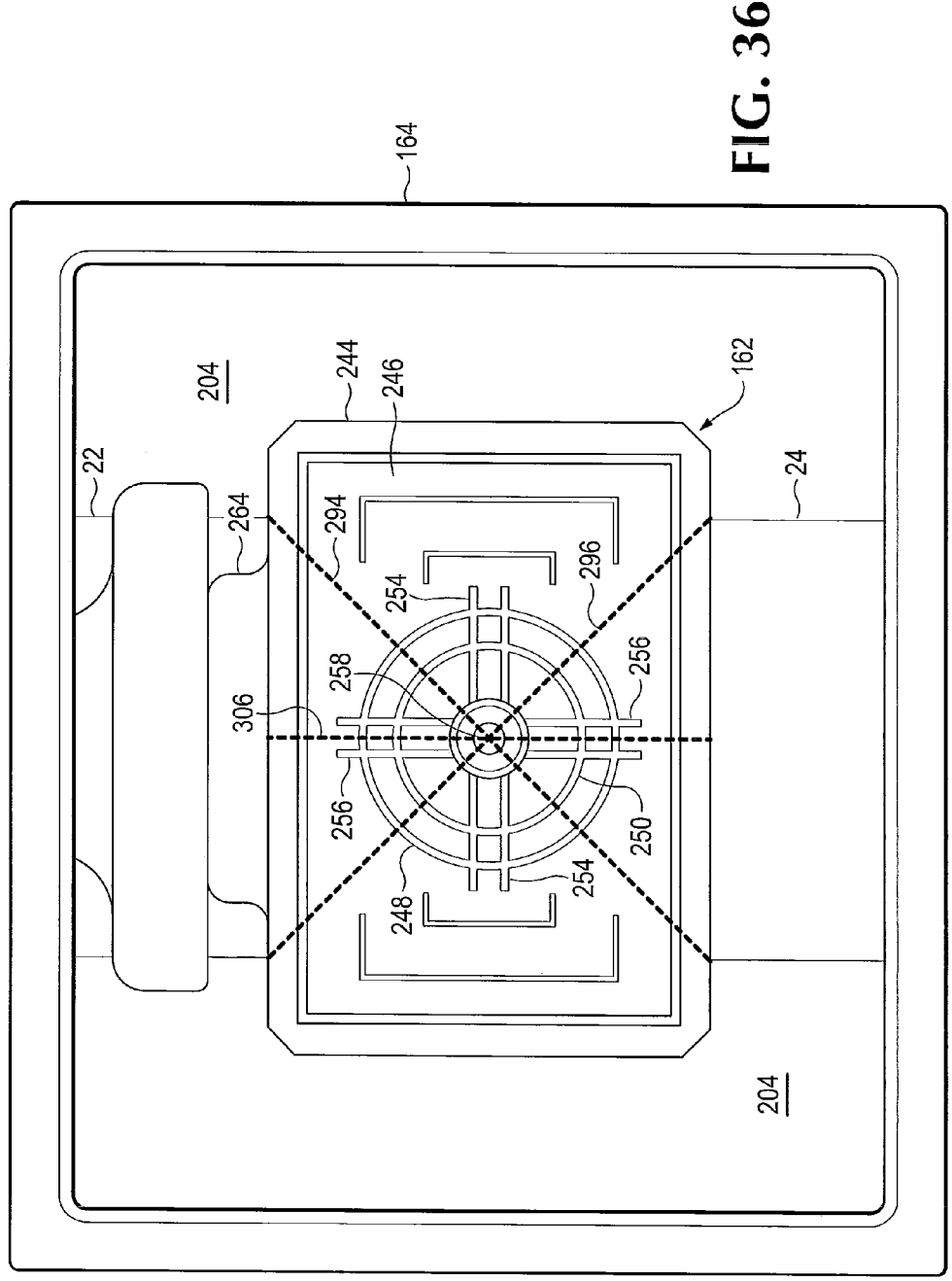

FIG. 36 is a view of a video monitor displaying an image created by a camera in the towing vehicle-mounted module shown in FIG. 35, when the towing vehicle-mounted module shown in FIG. 35 is in use and the towing vehicle on which it is mounted is in the hitch-mating position with respect to a trailer equipped with the trailer-mounted module shown in FIGS. 19 and 23-26.

Figure 37:
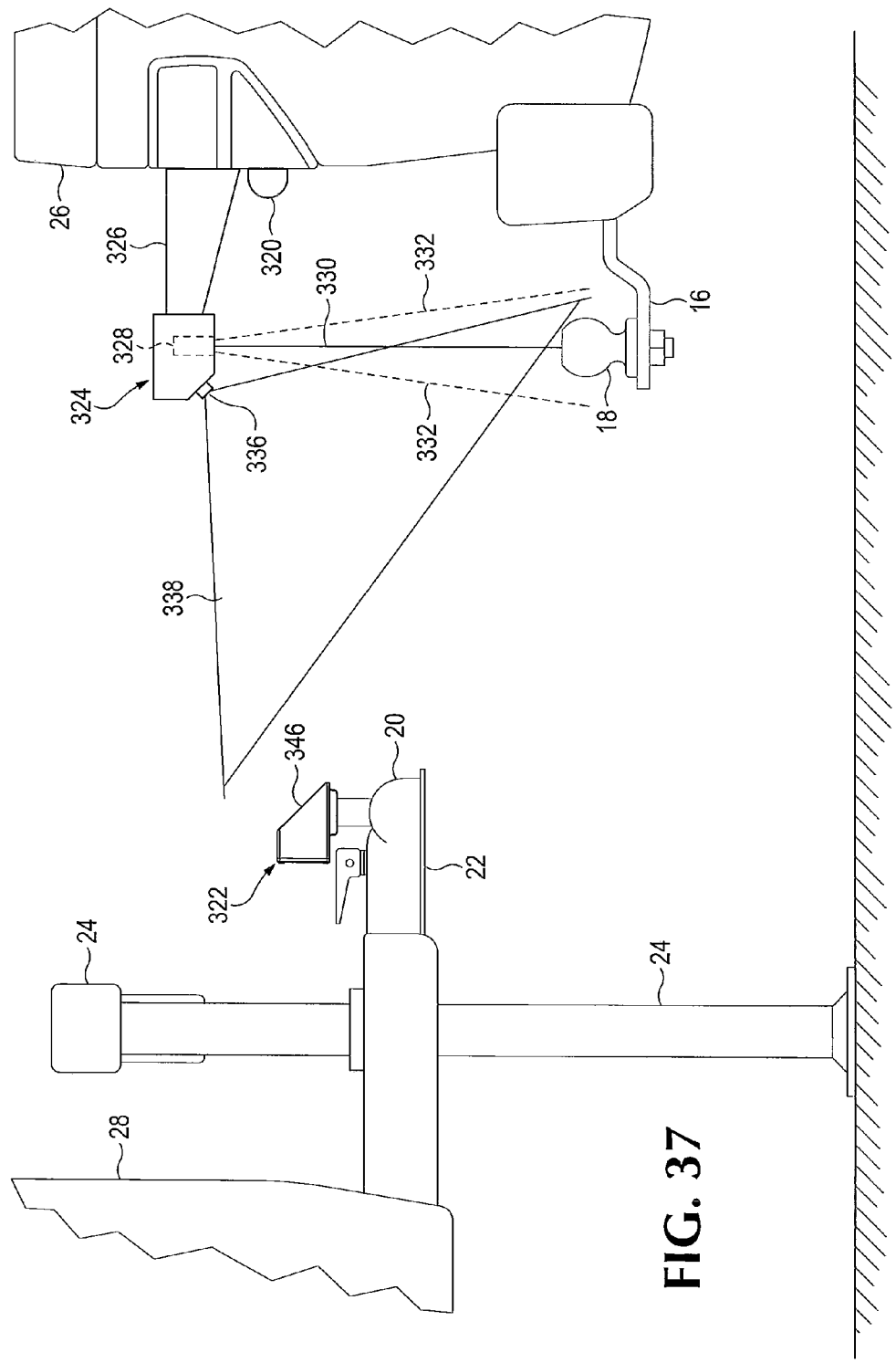

FIG. 37 is a side elevational view of hitch-alignment facilitating apparatus in which a trailer-mounted module is located above a coupler portion of a trailer hitch and a towing vehicle-mounted module is supported so as to have a view directly downward toward a trailer hitch ball on a towing vehicle equipped with a backup camera.

Figure 38:
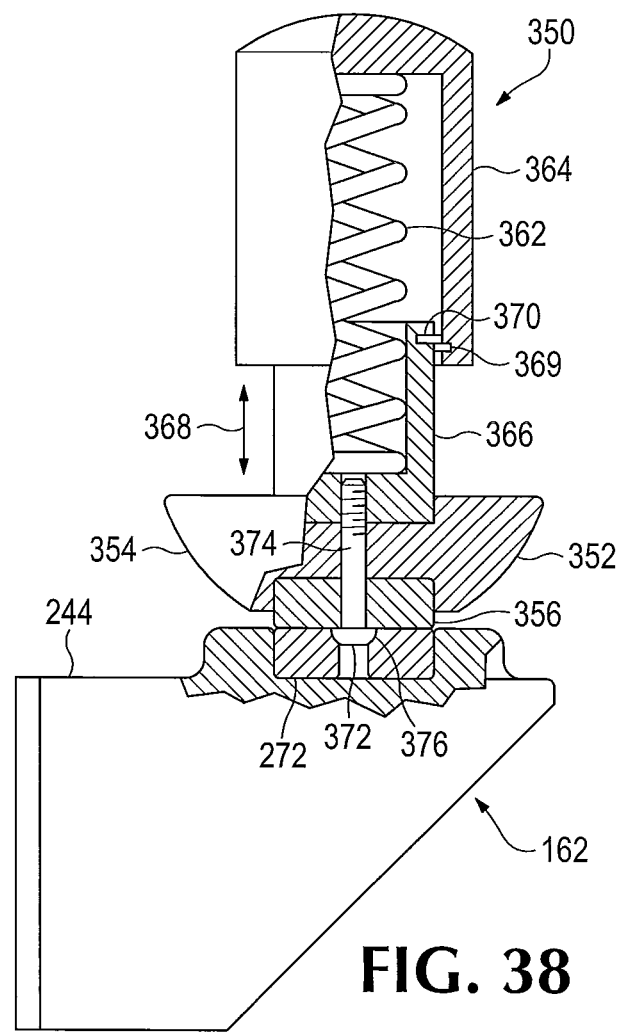

FIG. 38 is a side elevational view, partly in section, showing a trailer-mounted module of the hitch-alignment facilitating apparatus disclosed herein, together with a mounting device for mating with a trailer hitch coupler to support the trailer-mounted module.

DETAILED DESCRIPTION OF EMBODIMENTS

Referring to the drawings which form a part of the disclosure herein, in FIG. 1 a trailer hitch for a towing vehicle (not shown) includes a short drawbar 16 on which is mounted a trailer hitch ball 18 including a horizontal top surface 19, as is commonly used in interconnecting towing vehicles with trailers ranging from the smallest in size up to those weighing several thousand pounds.

A trailer such as a recreational camping trailer includes a hitch coupler 20 on its tongue 22. Except for the smallest of trailers, a lift device such as an adjustable jack stand 24 is associated with the tongue, either as a permanent attachment or temporarily mounted on the tongue 22 whenever the trailer is not connected to a towing vehicle. The lift device is used as shown schematically in FIG. 2 to raise the tongue of the trailer to a great enough height to permit the trailer hitch ball 18 or equivalent portion of the trailer hitch on the towing vehicle to be placed beneath the trailer hitch coupler 20 that is mounted on the tongue 22 of the trailer, as shown in FIG. 2. When the coupler 20 mounted on the tongue of the trailer is located directly above the trailer hitch ball 18 on the towing vehicle the lift device 24 may be operated to lower the tongue of the trailer until the coupler 20 moves down to surround and rest upon the hitch ball 18, allowing the coupler to be fastened to mate the coupler securely with the trailer hitch ball. Once necessary electrical connections (not shown) are made for brakes, turning signals and brake lights, and after safety chains and load leveling levers, (not shown) are connected and adjusted, the lift device 24 can be operated to place the weight of the trailer tongue on the trailer hitch of the towing vehicle.

In FIG. 3 a towing vehicle, for example a pickup truck 26, is shown in an initial position ahead of a trailer 28, ready to be backed toward the trailer 28 to permit the hitch coupler 20 on the trailer tongue 22 to be mated with the trailer hitch ball 18 carried on the towing vehicle 26.

As shown in FIGS. 3 and 4, a hitch-alignment guidance system as disclosed herein includes in one embodiment a towing vehicle guidance module 30 mounted on the trailer hitch ball 18, a corresponding towed vehicle module 32 that is mounted on the tongue 22 of the trailer 28, and a video display device 34 (as shown in FIG. 9) located in view of the operator of the towing vehicle 26. In the embodiment shown herein, the towing vehicle module 30 is mounted adjustably on the hitch ball 18 of the towing vehicle 26 and thus can be rotated about any axis to place it into the correct alignment with respect to the towing vehicle 26. The corresponding towed vehicle module 32 may be equipped with a mounting ball 36 similar in size to the trailer hitch ball 18, and may be attached to the tongue 22 of the trailer by mating the mounting ball 36 with the trailer hitch coupler 20 on the trailer tongue 22. The mounting ball 36 may be made of a suitable metal or plastics material, with a plastics resin being preferred because of its lower cost and weight. When so mounted, the towed vehicle module 32 is also adjustable about any axis to align it for use of the apparatus disclosed herein to guide the towing vehicle 26 into position to mate the coupler 20 with the hitch ball 18.

Referring now also to FIG. 5, the towing vehicle module 30 may have a housing or case that can be folded about a hinge 42 into a compact configuration comparable in size to a telephone handset. The towing vehicle module may also be separable into two separate portions, by removal of an upper portion 44 from a generally horizontal base portion 46 so that the upper portion 44 can be used separately, as will be explained presently. A quick disconnect multi-conductor junction 48 is provided to permit the upper portion 44 of the towing vehicle module 30 to be folded about the hinge 42 as suggested by the arrow 50 to place the towing vehicle module 30 into its more compact configuration, or to permit the upper portion 44 to be removed from the base portion 46 for separate use.

The towing vehicle module 30 is shown mounted on the trailer hitch ball 18, to which it may be attached removably by a suitably strong magnet 52 housed in the base portion 46, and an arrangement of feet 54 that rest on the hitch ball 18, acting as a socket to support the towing vehicle module 30 so that it can be swiveled in any direction about the hitch ball 18. For use of the towing vehicle module 30 with a different sort of hitch arrangement instead of such a ball-and-socket hitch the towing vehicle module could be attached by using a different arrangement not shown herein but which should permit adjustment in all directions.

The base portion 46 of the towing vehicle module 30 includes a hitch alignment indicating light beam projector 56 such as a small laser of the type used in laser pointers, arranged to project a beam 57 of visible light directly upward, that is, in a direction perpendicular to a flat upper surface 58 of the base portion. The projector 56 is located so that when the upper surface 58 of the base portion 46 is horizontal the beam of light from the projector 56 will be directed vertically upwards above the center of the hitch ball 18. The light beam projector may be arranged to project a cruciform beam 57 upward, or it may project a simple, narrow beam to shine a small spot on a surface.

The base portion 46 of the towing vehicle module 30 preferably includes a level 60 to aid in placing the towing vehicle module 30 on the hitch ball 18 so that the upper surface 58 of the base portion 46 is horizontal when the towing vehicle module 30 is mounted and ready for use. Leveling may be accomplished using a single circular level 60 as shown or a pair of small elongate tubular levels oriented perpendicular to each other and aligned with the upper surface 58 of the base portion 46. The top of the base portion 46 may include a removable transparent plate 62 of strong plastic, and a pair of small lamps 64, such as upwardly directed LEDs, may be housed within the base portion 46 to provide illumination during nighttime use of the hitching guidance system.

A small long distance guidance light beam projector 66, which may also be a small laser, is mounted at the rear end of the base portion 46 and is arranged to project a beam 68 of light rearwardly from the towing vehicle to serve as a long distance guide and a distance indicator when the towing vehicle module 30 is correctly mounted and adjusted. The position of the light beam projector 66 may be adjustable with respect to the base portion 46 in order to project the beam of light at a selected acute angle 70 above horizontal. The angle 70 may be selected so as to make the beam of light 68 strike the front of the trailer 28 or other vehicle to be towed in a visible position when the towing vehicle 26 is separated from the trailer 28 by a selected distance. Thus in one embodiment of the device the light beam projector 66 may be a low power laser oriented at an angle 70 of 22.5 degrees above horizontal, so that the beam 68 of light will strike the front of a camper trailer, depending on its height, when the towing vehicle 26 is several feet ahead of the hitch mating position in which the trailer 28 can be coupled to the towing vehicle 26.

Mounted on and extending upwardly from the base portion 46, the upper portion 44 of the towing vehicle module 30 includes an electronic image-forming device such as a video camera 72 arranged to provide an electrical image signal that can be transmitted either wirelessly or by wire, for continuous display on a monitor screen 74 of the video display device 34 located in the operator's cab of the vehicle where it can be seen conveniently by the vehicle operator. For example, the video camera 72 may be a small digital video camera including a sensing device capable of providing digital video image transmission of suitable definition for display on the monitor screen 74. A target reticle 76 may be included in the camera so as to be visible in the image transmitted by the camera to the monitor screen 74, as shown in FIG. 8, as an indication of the center of the field of view of the camera. The camera 72 includes a self-leveling lens and automatically focusing arrangement in one embodiment. A connector 78 is provided for a cable 80 for signal transmission and for external power to be provided from the electrical system of the towing vehicle 26 to the towing vehicle module 30.

The upright upper portion 44 of the towing vehicle module 30 may include a level 82 arranged to indicate whether the upper portion 44 is correctly aligned in a vertical orientation when the base portion 46 is mounted with its upper surface 58 horizontal, to insure that the entire towing vehicle module 30 is correctly aligned.

A set of hanger receivers 84 may be mounted on the rear side of the upper portion 44, either alone or accompanied by suction cups 86 so that the upper portion 44 can be mounted in a desired location, as on the rear of a trailer 28, either by the use of a separate hanger (not shown) or by the suction cups 86.

An upper, or short range guidance, light beam projector 90, which may also be a small laser pointer light, may be provided near the top of the upper portion 44 of the towing vehicle module 30, and preferably has a light beam 92 of a different color from the beam 68 of the lower, or long distance guidance light beam projector 66 in the base portion 46 of the towing vehicle module 30. The short range guidance light beam projector 90 may be arranged to project a beam 92 of light rearward and at an acute angle 94 below the horizontal. For example, in one embodiment, as shown in FIG. 5, the short range guidance light beam projector 90 is arranged to direct the light beam 92 at an angle 94 of 45 degrees below the horizontal, to provide an indication of when the towing vehicle 26 is closely approaching the hitch-mating location where it can be coupled to the trailer 28, as will be explained in greater detail presently.

Located below the camera 72 there may be a small lamp 96, such as an LED, that may be utilized at night to help illuminate the area behind the towing vehicle 26, and particularly to illuminate the towed vehicle, or trailer-mounted, module 32 as the towing vehicle 26 approaches the trailer 28 or other vehicle that is to be towed. Both the camera 72 and the lamp 96 may be mounted on the face of the upper portion 44, and both may be covered by a transparent cover 98 that can easily be wiped clean, but which protects the interior components of the upper portion 44 from the weather or water that may be splashed toward the towing vehicle module during its use. Ideally both the towing vehicle module 30 and the towed vehicle module 32 are insulated and waterproof, to withstand use in wet weather.

Thus, as may be seen in FIGS. 3 and 4, when the towing vehicle module is mounted on the trailer hitch ball, projected light beams 57, 68, and 92 from the three light beam projectors 56, 66, and 90 are coplanar, and the alignment light beam projector 56 is located centrally above the top of the trailer hitch ball 18 and aimed directly upward.

Also located adjacent the front face of the upper portion 44 may be a switch, such as a magnetically operated reed switch 100, which may be actuated as will be explained presently to provide an audible indication when the towing vehicle 26 is nearly in the required position for mating the trailer hitch coupler 20 and hitch ball 18 to each other.

A suitable rechargeable electric battery 102 is housed within the upper portion 44 to provide required electrical current for the camera 72, the lasers or other light beam projectors 56, 66, and 90, and the lamps 64 and 96 included in the towing vehicle module 30 when power is not available from the cable 80. A solar cell and an associated recharging circuit may also be provided to maintain a charge in the battery 102. This can be particularly valuable in case of separate remote use of the upper portion 44, as will be explained below. Suitable connecting wiring, shown greatly simplified, is provided, and manually operable control switches 104 are mounted in a convenient location on the rear side of the upper portion, and include, for example, respective on-off switches for the long distance and short range light beam projectors 66 and 90, the hitch alignment light beam projector 56, the digital camera 72, and the lamps 64 and 96.

An electronic circuit board 106 may be mounted within the upper portion 44 of the towing vehicle module 30 and may contain circuitry related to wireless transmission of the video camera images to the display device 34 and capable of transmitting a video signal that can be received at distances up to several hundred feet from the upper portion 44, as well as for a satellite global positioning system receiver and a related locator beacon transmitter optionally included in the upper portion 44 of the towing vehicle mounted module 30, and other circuitry related to the camera 72, the light beam projectors 56, 66, and 90, and the lamps 64 and 96.

The target, or trailer-mounted module 32 includes a body housing 108 and may have a transparent planar front target face 110 including a calibrated graticule 111 or grid of parallel horizontal lines and a vertical center line. The target body housing 108 may include a suitable level 112, and the orientation of the target body can be adjusted by moving the ball within the trailer hitch coupling 20, or by adjusting another movably adjustable connector, (not shown), by which the trailer-mounted module 32 may be attached to the trailer tongue 22 or the trailer hitch coupling 20 mounted on the vehicle that is to be towed. The position of the target body housing 108 is adjusted using the level 112, to place the front target face 110 in a vertical orientation.

Located within the target body housing 108 and spaced rearwardly from the front target face 110 is an inclined target plate 114 of transparent material such as a polymethyl methacrylate or a polycarbonate on which a target reticle 116 is inscribed clearly and distinctly enough to be visible to the camera 72 through the front target face 110 when the towing vehicle approaches closely enough to the vehicle 28 that is to be towed. The target reticle 116 is located so as to be centered directly beneath the ball receptacle of the trailer hitch coupler 20 when the housing 108 is level. A front or lower, surface 118 of the inclined target plate 114 may be ground or etched so as to make a beam or spot of light falling upon the surface 118 clearly visible to the camera 72, as seen through the front target face 110. A small lamp 120, such as a small LED, may be used to provide edge illumination of the inclined target plate 114. The target shape reticle 116 is contrastingly marked on the inclined target plate 114, so that light from the edge lamp 120 is clearly visible in daylight or at night to allow the digital camera 72 to see the target reticle 116 clearly.

The target housing body 108 may be attached to the mounting ball 36 or other support structure by a swivel defining an axis 122 parallel with the front, target face 110, so that the target body housing 108 may be moved through an angle 124 (see FIG. 3A) about the axis 122 of the swivel to direct the front target face 110 toward the towing vehicle 26 while the towing vehicle is being backed into the hitch mating location, as will be described in greater detail presently. For the sake of convenient use and the best results, the swivel axis 122 should extend through the center of the target reticle 116.

Small lamps 126 which may, for example, be LEDs, may provided in the top of the body housing 108 to shine upwardly and illuminate the tongue 20 and adjacent parts of the trailer 28 to assist in making the trailer 28 or other vehicle to be towed easily visible in the field of view of the camera 72 included in the towing vehicle module 30.

A tongue height and directional alignment light beam projector 128, such as a small low powered laser, is mounted in the target body housing 108 and is located and aimed so as to direct a beam 130 of visible light directly through the front target at a center point 132 appropriately marked on the front target face 110, as shown in FIG. 6. This beam 130 of light is useful, as will be explained more fully presently, in initial preparation for backing the towing vehicle 26 toward the trailer 28 so as to place the towing vehicle in the required hitch-mating position for coupling the trailer hitch. A horizontal central opening 134 may be provided through the inclined target plate 114, and the projected light beam 130 is directed through that hole. Alternatively, the inclined target plate 114 may be imperforate, and the light beam projector 128 may be located within the housing 108 so that the beam 130 of light, after refraction by the inclined target plate 114, passes through the center 132 of the target front face 110.

Appropriate electrical batteries 136 are provided within the target body housing 108 to power the lamps 120, 126 and the light beam projector 128, and appropriate switches 138 are provided to control operation of the lamps 120, 126 and the light beam projector 128.

A small magnet 140 may be carried in a support such as a small telescoping tubular housing 142 which permits the magnet to extend forward a small distance, such as about 1½ inches, from the target front face 110. The magnet 140 is located where it is aligned with the location of the magnetic reed switch 100 in the towing vehicle module 30 when the towing vehicle is located in the optimal hitch-mating position for mating the coupler 20 with the hitch ball 18.

As an alternative to holding the ball 36 in the socket of the coupler, the trailer-mounted module 32 may be carried on a retractable and extendable support arm 142 mounted on the trailer tongue 22 as shown in FIG. 8. A semicircular yoke 143 holds the trailer mounted module 32 on the arm 142 so that it can be rotated about the swivel axis 122 (add to FIG. 8), with the swivel axis extending through a point about which the trailer hitch coupling on the trailer 28 is rotatable with respect to the towing vehicle 26 when the trailer hitch parts are mated and ready for use. When not in use the towed vehicle module 32 is carried in the retracted position shown in broken line. At least in such an embodiment, the trailer-mounted, or towed vehicle, module 32 should be waterproof, so as to withstand immersion as when carried on a boat trailer during launching or recovery of a boat.

Figure 8A:
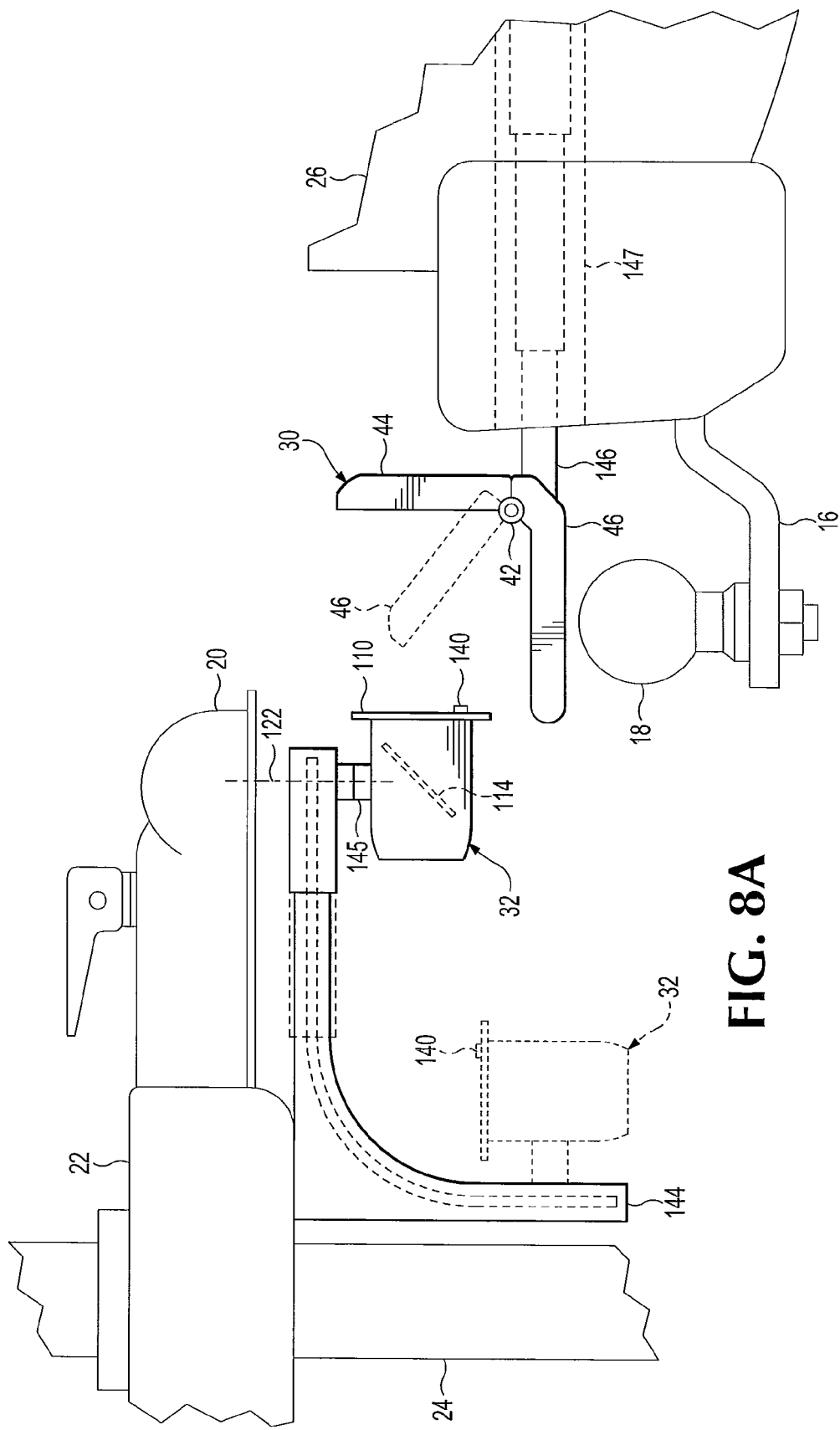
FIG. 8A is a side elevational view of a portion of a trailer tongue, with a retractable trailer-mounted module on a slide track attached to the trailer tongue, as well as a portion of a towing vehicle bumper and trailer hitch, with the towing vehicle module carried on a retractable slide.

As another alternative for mounting the trailer-mounted module 32, as shown in FIG. 8A a slide track 144 may be provided on the trailer tongue to hold the towed vehicle, or trailer-mounted, module 32. With the trailer-mounted module 32 located as shown in solid line the reticle 116 on the inclined target plate 114 is centered below the coupler 20 for use. The module may be held by a swivel joint 145 so that it can be adjustably pivoted about the axis 122 as explained above. When not in use the module 32 can be withdrawn along the slide track 144 and carried in a retracted position and a front position of the slide track 144 may be telescoped back over the rear part, as shown in broken line in FIG. 8A, so as not to interfere with the trailer hitch ball 18 and socket 20.

Similarly, a telescoping support slide 146 for the towing vehicle module 30 may be mounted in a specifically provided storage location such as a protective compartment 147 in a rear end portion of the towing vehicle 26, adjacent the trailer hitch. The towing vehicle module 30 can be supported on the support slide 146, either retracted into the storage location, or with the slide 146 extended to a position in which the towing vehicle module 30 is located directly above the hitch ball 18. In the extended position as shown in solid line in FIG. 8A, the towing vehicle module 30 is used in the same manner as when mounted on the hitch ball 18 as shown in FIGS. 2-5.

The towed vehicle, or trailer-mounted module 32 may be mounted as shown in FIGS. 8 and 8A as original equipment, or as after-market equipment. The towing vehicle module 30 may also be mounted as shown in FIG. 8A as original equipment, or as an option for towing vehicles in which a rear end structure may include or may be modified easily to include a storage compartment 147.

The video display device 34 may be mounted as seen in FIG. 9, on the dashboard of the pickup truck or other towing vehicle 26, either as added equipment, or built into the dash of the towing vehicle 26 as original equipment, in which case it may be designed for multiple uses such as to display GPS mapping systems or other vehicle operational information of interest, as well as being electrically connected so that the monitor screen 74 is available additionally for use in connection with the hitch-alignment facilitating apparatus disclosed herein. It could also be built to interface with existing original equipment dash-mounted displays, portable monitors, laptop computers, or portable GPS and mobile telephone display units.

As shown in FIG. 9 the monitor screen 74 displays an image of the trailer 28 as seen by the camera 72 when the towing vehicle module 30 is properly mounted and adjusted, and with the towing vehicle 26 in position ahead of the trailer 28, ready to begin backing toward the trailer. The transparent front target face 110 of the trailer mounted, or target, module 32 is clearly visible, and the target reticle 116 on the inclined target plate 114 is also visible through the transparent front target face 110. Additionally, the reticle 76 in the camera 72 is also visible in the monitor screen 74, as are the light beam, or spot, 68 which may be of a first color, for example red, projected from the lower or long distance guidance light beam projector 66 of the base portion 46 of the towing vehicle module 30 and another light beam, or spot, 92, which may optionally be of a second color such as green, projected by the upper, or short range guide light beam projector 90 carried in the upper portion 44 of the towing vehicle module 30. In addition to or instead of a small spot the light beams 68 and 92 may be projected as horizontal lines by the projector.

Trailer Hitching Procedure

Figure 3A:
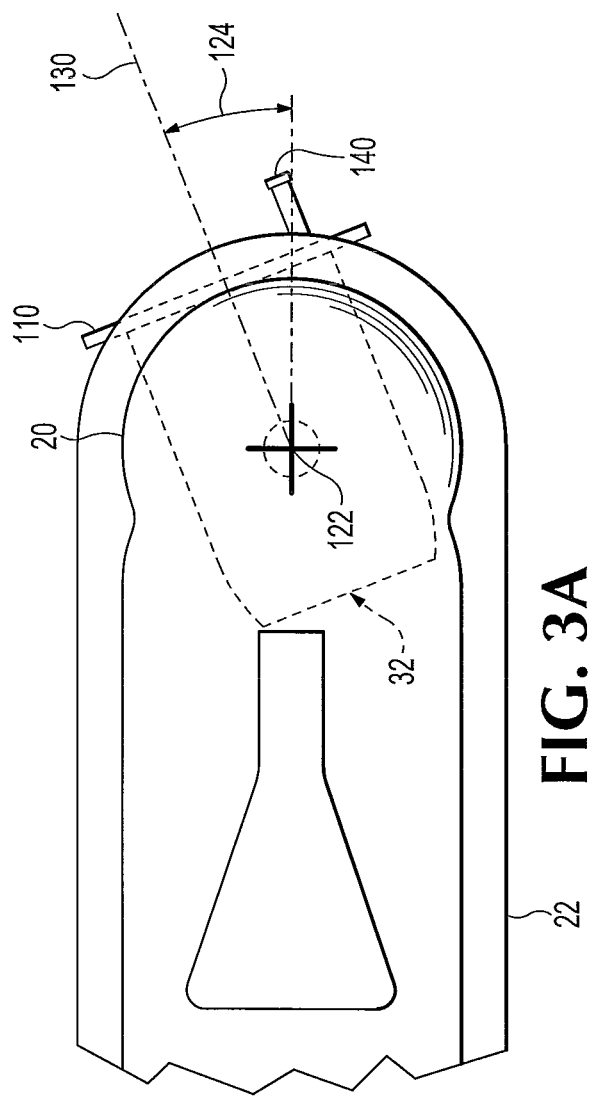
FIG. 3A is a top plan view of a portion of the trailer tongue and a trailer-mounted module as shown in FIG. 3.

In order to utilize the hitch alignment facilitating system described above for placing the towing vehicle 26 in the correct location for mating the hitch coupler 20 on the trailer tongue 22 to the trailer hitch ball 18 on the towing vehicle 26, the target, or trailer-mounted, module 32 is attached to the coupler 20 on the tongue 22 of the trailer 28 or other vehicle that is to be towed, and the towing vehicle module 30 is mounted on the trailer hitch ball 18 of the towing vehicle, as described and illustrated above. When the trailer-mounted module 32 is level the swivel axis 122 is vertical, and the body or housing 108 is rotated about the swivel axis 122 until at an angle 124 the beam 130 of light from the light beam projector 128 is directed toward the towing vehicle module 30, as shown in FIGS. 3, 3A, and 4. If both the towing vehicle 26 and the vehicle 28 that is to be towed are on flat, level ground, the trailer tongue lift 24 can then be operated to bring the tongue 22 of the trailer 28 to a height at which the beam 130 of light projected from the light projector 128 is directed toward the lens of the camera 72 in the towing vehicle module 30. This will place the trailer hitch coupler 20 at a preferred height to provide clearance for the base portion 46 of the towing vehicle module 30 to pass beneath the trailer-mounted module 32 of the hitch-guiding apparatus as the towing vehicle 26 is backed into the hitch-mating position. Once the height of the trailer tongue 22 has been adjusted the height guidance light beam 130 can be turned off by the appropriate switch 138.

With the towing vehicle module mounted and level as described above, the central axis of the field of view and the reticle 76 of the camera 72 should be aimed directly rearwardly, as indicated by the right angle 152 in the horizontal plane, shown in FIG. 3, and the laser or other light beams 68 and 92 from the guidance beam projectors 66 and 90 are then also directed rearwardly. The video camera 72 is then turned on, and its view is displayed as an image on the monitor screen 74 in the towing vehicle, in view of the vehicle operator, as shown in FIG. 9. The towing vehicle 28 is then moved backward toward the tongue 22 of the trailer, which is clearly shown on the monitor screen 74. As the towing vehicle 26 approaches the trailer 28 the towing vehicle 26 should be steered carefully to keep the target or towed vehicle module 32 centered in the image of the camera reticle 76 rather than to one side as shown in broken line. The light beam 68 from the long distance guidance light beam projector 66 will be visible where it impinges on the front of the trailer 28, once the towing vehicle is within several feet from the required position for connection of the trailer hitch coupler 20 to the trailer hitch ball 18. The distance where the light beam 68 can be observed is determined by the angle 70 at which the long distance guidance beam is oriented above horizontal, the length of the trailer tongue 22, and the height of a front surface of the trailer 28 on which the light beam 68 can fall.

As the towing vehicle 26 is backed closer toward the required hitch mating location, the long distance guidance light beam 68 will move downward along the front of the trailer, while the image of the front target face 110 on the front of the towed vehicle module 32 will grow larger in the monitor screen 74 as the camera 72 moves closer to it, as shown in FIG. 10. If the trailer and the towing vehicle are on anything other than flat level ground, it is desirable, when the towing vehicle 26 and the trailer 28 are separated by no more than a few feet, to confirm that the trailer tongue 22 is at the required height relative to the trailer hitch ball 18 on the towing vehicle, as by again operating the height adjustment light beam projector 128 and, if necessary, adjusting the lift 24 supporting the trailer tongue 22 so that the height adjustment light beam 130 is directed toward the lens of the camera 72.

The laser beam 68 from the long range guidance beam projector will impinge on the trailer at a location that appears to be vertically above the target front face 110, and as the towing vehicle module 30 approaches closer to the trailer mounted module 32 the long distance guidance light beam will become visible on the target front face 110 when the hitch ball 18 is several inches from the coupler 20, as shown in FIG. 11.

As the towing vehicle 26 is moved further backwards toward the trailer 28, with the target center 132 on the target front face 110 of the towed vehicle module 32 kept centered within the camera lens reticle 76, the upwardly inclined light beam 68 of the long distance guidance light beam projector 66 will strike the top of the front target calibrated graticule 111, indicating that the towing vehicle is closely approaching the hitch mating location. If the trailer hitch coupler 20 is adjusted correctly in height the horizontal lines of the graticule 111 will give an accurate indication of the distance through which the towing vehicle 26 still needs to move rearwardly to the desired hitch-mating position. The beam 68 will move downward along the front target face 110 as the base portion 46 of the towing vehicle module 30 approaches the front target face 110 until the lower light beam 68 progresses down to the bottom of the front target face 110 just before the base portion 46 of the towing vehicle module 30 passes beneath the target face 110. It should be apparent to the towing vehicle operator viewing the monitor screen 74 if the height of the trailer tongue is not correct, as the center 132 of the front target face 110 will appear to be too high in the lens reticle 76 of the camera 72 if the trailer tongue 22 is too high, or will appear too low in the lens reticle 76 field of view of the camera 72 if the trailer tongue 22 is too low. If such misalignment appears then the operator should stop backing toward the trailer 28 and adjust the height of the trailer tongue 22 to be sure that the towing vehicle hitch ball will be able to pass properly beneath the tongue of the trailer, and that the base portion 46 of the towing vehicle module 30 can pass beneath the target, or towed vehicle module 30.

Once the upwardly inclined long distance guidance laser beam approaches the bottom of the front target plate the downwardly inclined light beam 92 from the short range guidance light beam projector 90 at the top of the upper part 44 of the towing vehicle module 30 should become visible at the bottom of the front target face 110 if the trailer tongue 22 is at the correct height with respect to the trailer hitch ball 18 on the towing vehicle. When the green laser beam 92 of the upper laser light beam projector 90 is visible on the front target calibrated graticule 111 the towing vehicle 26 is very close, within about two inches, to the desired hitch-mating location. The light beam 57 from upwardly directed hitch alignment light beam projector 56 in the base portion 46 of the towing vehicle module 30 should then be visible to the camera 72 at the top of the inclined target plate 114 within the towed vehicle module 32, as shown in broken line in FIG. 7. At about that distance the magnet 140 may activate the reed switch 100 causing an audible signal to be sounded by the display device 34.

As the towing vehicle 26 is backed further the laser beam 57 will appear to move down across the target reticle 116 defined on the inclined etched target plate 114, until, when the towing vehicle is in the correct position, as shown in FIG. 12 the laser beam 57 will appear to be centered in the target on the inclined etched target plate. The towing vehicle operator should then stop the towing vehicle 26, set its brakes, and then remove both modules 30 and 32 of the hitch guidance apparatus from their respective places on the towing vehicle trailer hitch ball 18 and the trailer hitch coupler 20 and then lower the trailer tongue 22 to mate the coupler 20 with the trailer hitch ball 18.

Additional Functionality

While the principal utility of the apparatus described above is in enhancing the ability to back a towing vehicle 26 easily and accurately to a mating location where a trailer hitch can be coupled, the ability to transmit a video image wirelessly from the camera 72 to the monitor screen 74 near the towing vehicle driver's position makes the upper portion 44 of the towing vehicle module 30 otherwise conveniently useful, both in connection with backing the trailer 28 and while towing the trailer 28 along a highway. Since the upper portion 44 of the towing vehicle module 30 can be removed from the base portion 46 by use of the quick disconnect coupling 48, the upper part 44 can be mounted on the rear of the trailer 28, as shown in FIG. 13, either by use of the suction cups 86 or by the use of an appropriate hanger (not shown) and the hanger receivers 84. Video images from the camera 72 can then be transmitted wirelessly to the display device 34 in the towing vehicle 26, so that the driver of the towing vehicle can see what is behind the trailer 28 as the trailer is backed into a parking position, making it much easier to park the trailer safely. Additionally, the camera 72, when mounted on the back of the trailer 28, can be used while towing the trailer along a highway, to provide a much better view of vehicles following the trailer 28 than is normally available simply by using ordinary side view mirrors on the towing vehicle 26.

Within a limited distance from the towing vehicle, the camera 72 can be used by a person carrying the unit to transmit a view to the video display device 34 in the towing vehicle 26. A suitable wireless receiver and antenna, capable of receiving the transmitted signal from the towing vehicle module and providing both audio and video output signals to the monitor, may be connected with the monitor.

Optionally, the towing vehicle module 30 can include a Global Positioning System (GPS) satellite unit and a beacon transmitter 148 contained in the upper portion 44, as shown in simplified form in FIG. 5. The GPS navigation system may be designed to communicate with commercially available satellite radio and mapping services. The GPS unit included in the upper portion 44 can thus be carried by a person venturing away from the location of the towing vehicle 26, as when the towing vehicle 26 is left in a camp and a person hikes into nearby wilderness, where the beacon transmitter, coupled with the GPS unit in the upper portion 44, is available as an emergency beacon transmitting its location in case the user is injured or becomes disoriented.

In connection with use of the GPS beacon, a separate handheld mobile telephone and beacon monitor unit 150, such as that shown in FIG. 14, may be used to determine and display the location of a person carrying the upper part of the towing vehicle module. This acts as a safety feature in conjunction with use of the upper portion 44 of the towing vehicle module 30, which, in one embodiment of the device, may include a low power radio telephone able to conduct two-way communications with such a separate self-contained handheld unit 150. Alternatively, the handheld unit 150 may include circuitry capable of utilizing existing cellular or satellite mobile telephone or wireless computer communications systems to receive and display the GPS beacon data showing the location 154 of the upper portion 44 of the towing vehicle module 30 carried by a person at some distance from the towing vehicle in which the video display device 34 is installed and operated. The beacon monitor unit could thus be used with appropriate identifying codes to locate the upper portion 44 either locally or at great distances, depending on the associated communication system used.

The monitor screen 74 of the display device 34 in the towing vehicle 26 may be equipped and programmed with a touch screen control interface for use in connection with programming a GPS navigation system setting to synchronize the display device 34 and the upper portion 44 of the towing vehicle module 30 with a satellite navigation system in connection with monitoring the location of the portable upper portion 44 of the towing vehicle module 30.

As an optional accessory, a portable, wearable visual display may be provided by a wearable display device 156 similar to a pair of virtual reality glasses known for use in connection with video computer gaming technology. One or two video display devices 34 may be provided in the wearable display device 156 for use instead of or as well as the dash-mounted video monitor screen 74, to provide an image from the video camera 72 to the operator of the towing vehicle 26, while the towing vehicle is backed into position for mating the trailer 28 to the towing vehicle 26.

Additional Embodiments

Another embodiment of the hitch alignment guidance system is shown in FIGS. 16-27. As shown in FIG. 16, a recreational camping trailer 28 includes a hitch coupler 20 on its tongue 22, and a towing vehicle drawbar 16 has a trailer hitch ball 18' that is to be mated with the trailer hitch coupler 20. A towing vehicle module or unit 160 mounted on the hitch ball 18' cooperates with a towed vehicle module or unit 162, which may also be called a trailer-mounted module, or a trailer unit, held by the coupler 20 to guide an operator of the towing vehicle 26 to bring the trailer hitch ball 18' on the towing vehicle 26 to a hitch-mating position directly beneath the coupler 20 mounted on the tongue 22 of the trailer. A video display device or monitor 164 (shown in FIG. 27) is located in view of the operator of the towing vehicle 26.

In FIG. 16 the towing vehicle 26, for example a pickup truck, is shown in an initial position ahead of the trailer 28, ready to be backed toward the trailer 28 to permit the hitch coupler 20 on the trailer tongue 22 to be mated with the trailer hitch ball 18' carried on the towing vehicle 26.

The towing vehicle module 160 is mounted adjustably on the hitch ball 18' of the towing vehicle 26, resting on the flat horizontal top surface 19 (shown in FIG. 19), and can be rotated about a vertical hitch pivot axis 165 normal to the surface 19, to align the towing vehicle module 160 to face directly rearward from the towing vehicle 26.

The corresponding towed vehicle module 162 may be equipped with a mounting ball 166 similar in size to the trailer hitch ball 18, and may be attached to the tongue 22 of the trailer by using the trailer hitch coupler 20 on the trailer tongue 22 to engage the mounting ball 166. The mounting ball 166 may be made of a suitable metal or plastics material, with a plastics resin being preferred because of its low cost and light weight. When so mounted, the towed vehicle module 162 is also adjustable, as will be explained in greater detail below, to align it for use of the apparatus disclosed herein to guide the towing vehicle 26 into position to mate the coupler 20 with the hitch ball 18'.

Referring now also to FIG. 19, the towing vehicle module 160 may have a housing or case 168 including a lower, or base, portion 170 located above the hitch ball 18', and an upper portion 172 that may include one or more laser modules, as well as a video camera 180.

The towing vehicle module 160 may be attached removably to the trailer hitch ball 18' by a suitably strong magnet 182. The magnet 182 may be of an annular shape and may be included in an adaptor 184 defining a shallow socket of a size to fit snugly against the outside of the ball 18'. The adaptor 184 is attached to the base portion 170 as by magnetic attraction and acts to hold the towing vehicle module 160 on the flat top surface 19 of the hitch ball 18' so that it can be swiveled to any direction about the axis 165. The adaptor 184 may have depressions 185 or annular grooves in its upper face to receive a projection such as a screw head 187 of a screw attaching a cover plate to the bottom of the lower portion 170, to locate the adaptor 184 correctly on the towing vehicle unit 160. For use of the towing vehicle module 160 with a different sort of towing vehicle hitch part instead of the ball 18' the towing vehicle module 160 could be attached by using a different adaptor not shown herein, but which should permit directional adjustment about a vertical hitch pivot axis 165 while maintaining a constant horizontal attitude.

The base portion 170 of the towing vehicle module 160 may include a light beam projector 186 such as a small laser module arranged to project a hitch alignment beam 188 of visible light directly upward above the hitch ball 18', in a direction perpendicular to the horizontal upper surface 19 of the hitch ball 18'. As shown best in FIGS. 16 and 19, the light beam projector 186 may be located in the base portion 170 so that it projects its beam of light horizontally onto a reflective surface such as a prism (not shown) or a mirror 190 located in the base portion 170 of the towing vehicle unit 160, so that the beam of light 188 will be directed vertically upwards above the center of the hitch ball 18'. The light beam projector 186 may be arranged to project a cruciform scanning beam 188 upward, along the pivot axis 165 defined by the center of the hitch ball 18', or it may project a scanning beam oriented as shown in FIG. 21, to project a horizontal line, or it may project a simple pinpoint beam to shine a small spot onto the surface of the mirror 190. With the laser module of the light beam projector 186 oriented horizontally in the base portion 170 and directed rearwardly, a reflective surface of the mirror 190 at a 45-degree angle as shown in FIG. 19 will reflect the beam 188 upward, yet the lower or base portion 170 of the housing 168 may be constructed with a low profile to minimize the height by which the tongue 22 has to be raised to give ample clearance for use of the hitch alignment guidance system.

A long distance directional guidance light beam projector 192, which may also be a small laser module, is mounted at the rear end 194 of the base portion 170 and is arranged to project a beam 196 of light rearwardly from the towing vehicle 26 to serve as a long distance guide and a directional indicator for the towing vehicle operator when the towing vehicle module 160 is correctly mounted and adjusted. The long distance light beam projector 192 may be a line-generating laser module oriented to project a vertical line and thus scan in a vertical plane located centrally and oriented longitudinally with respect to the base portion 170, in order to project the beam of light 196 rearwardly, scanning within a selected acute angle 198 that must extend above the horizontal. Thus, in one embodiment of the towing vehicle module 160 the light beam projector 192 may be a low power line-generating laser module scanning through an angle 198 of 110 degrees centered on or above the horizontal, so that the beam 196 of light will strike the front of the trailer 28 when the towing vehicle 26 is separated from the trailer 28 by a selected distance such as several feet ahead of the hitch-mating position in which the trailer 28 can be coupled to the towing vehicle 26. When the towing vehicle approaches closer to the hitch-mating position the long distance light beam 196 should still fall on the towed vehicle module or trailer mounted module 162 of the apparatus described herein.

Extending upwardly from the front end of the base portion 170, the upper portion 172 of the towing vehicle module 160 includes an image-forming device such as the digital video camera 180 mounted to view rearwardly from the rear face 202 of the upper portion 172. The video camera 180 is arranged to transmit an electrical image signal, either wirelessly or by wire, for continuous display on a monitor screen 204 of the video display device 164, shown in FIG. 27, located in the operator's cab of the vehicle 26, where it can be seen conveniently by the vehicle operator. The camera 180 should have good low-light sensitivity, must be able to focus at a very close range, and should be able to form color images with suitable image resolution. One such waterproof video camera is available from the Top Well International Electric company of Guangdong, China as its model T-600 camera capable of 720(H)×576(V) PAL resolution and having a lens with a 170-degree field of view. A target tracking capability may be included in the camera 180 so that it can automatically focus on the trailer mounted unit 162 and form an image to be transmitted to the monitor screen 204, as shown in FIG. 27. Ideally a reticle 205 is displayed as part of the camera image to frame what the camera is focused on.

Located below the camera 180 in the upper portion 172 there may also be a close range center light beam projector 226 such as a line-generating laser module located to project a beam 228 scanning in a central, rearwardly and vertically aligned plane that also includes the hitch pivot axis 165 and coincides with the plane of the scanned beam 196 of the long distance directional guidance light beam projector 192, to fall on the towed vehicle or trailer-mounted module 162 as the towing vehicle 26 closely approaches the trailer 28.

A connector 206 (shown only schematically) may be provided for a cable for signal transmission and for provision of electrical power from the electrical system of the towing vehicle 26 to the towing vehicle module 160. A suitable rechargeable electric battery 210 may be housed within the housing 168 to provide required electrical power for the camera 180 and the lasers or other light beam projectors 186, 192, and 226 included in the towing vehicle module 160 when power is not available from a cable 208.

Suitable connecting wiring, not shown, is provided, and manually operable control switches such as a pushbutton switch 234 with a weather tight cover may be mounted in convenient locations on the upper portion 172, and may include, for example, a main on-off switch and respective on-off switches for the main hitch alignment, long distance, and close range center light beam projectors 186, 192, and 226. An electronic circuit module 240 may be mounted within the upper portion 172 of the towing vehicle module 160 and may contain circuitry providing for wireless transmission of images from the video camera 180 to the display device 205. For example a suitable 2.4 GHz wireless video transmitter operable on a 12V. power supply is available from Top Well International Electric company of Guangdong, China. An antenna 242 for the transmitter may be located on the towing vehicle module 160.

The target, or towed vehicle mounted module 162 shown in FIGS. 19 and 23-26 includes a body 244 that may have an inclined planar front target face 246 including a graticule 248 with visible indicia such as concentric loops 250 and pairs of parallel horizontal lines 254 and vertical lines 256 intersecting at the center 258 of the loops. The target body 244 may include a suitable level 260 on at least one side, and the orientation of the target body can be adjusted by moving the ball 166 within the trailer hitch coupling 20, or by adjusting another movably adjustable connector, such as a magnetically joined swivel 264, by which the body 244 may be attached to the ball 166. The position of the target body 244 may be adjusted using the level or levels 260 to place the front target face 246 in a preferred location and orientation. As shown in FIGS. 18 and 19, the center 258 of the target face 246 should be directly beneath the center of the ball receptacle of the coupler 20 when the body 244 is level, and the target face 246 may be inclined to face forward and downward at for example, 45 degrees to the horizontal.

The inclined target face 246 may be a plate of a transparent plastics material such as Plexiglas on which the graticule 248 is displayed clearly and distinctly enough to be seen clearly in an image transmitted by the camera 180 as the towing vehicle 26, with the towing vehicle module 160 mounted on the hitch ball 18', backs toward the vehicle 28 that is to be towed. For example the graticule may be engraved in the face 246, or an adhesively attached printed cover may be of material such as a prismatic remote sensing target reflector material 3000X of flexible synthetic resin sheet material with adhesive backing available from the 3M Company of St. Paul, Minn. Alternatively, a thin sheet metal cover cut to include slits defining the loops 250 and 252 and the lines 254 and 256 may be attached to a sheet of translucent plastic material of the target face 246. An outer surface 262 of the inclined target face 246 may be molded, ground or etched so as to make a beam or spot of light falling on the surface 262 clearly visible to the camera 180. A small lamp 263, such as a small LED, may be used to illuminate the inclined target face 246 from its edge to make the loops 250 and lines 254, 256 clearly visible. The loops 250 may be elliptical, to appear as circles in images generated by the camera 180 as the towing vehicle 26 approaches the trailer 28. The target graticule 248 should in any case be marked contrastingly on the inclined target face 246, so as to be clearly visible in daylight and at night, to allow the camera 180 to form a clear image of the target graticule 248.

The swivel 264 may define an axis 266 extending through the center 258 of the target face 246 and the center of a ball held in the coupler 20, so that the body 244 of the towed vehicle or trailer unit 162 may be turned, as through an angle 268 (see FIG. 20) about the axis 266 of the swivel, to direct the target face 246 toward the towing vehicle 26 while the towing vehicle is being backed into the hitch-mating location, since the towing vehicle 26 may initially not be directly ahead of the towed vehicle 28. To permit the trailer unit or target body 244 to be dislodged, rather than be crushed, if the towing vehicle or the towing vehicle module 160 accidentally collides with the trailer unit 162, the mounting ball 166 may be made of magnetic material or include an insert 270 of magnetic material, and the body 244 may have a suitably strong magnet 272 to attach the body 244 to the ball 166. The magnetic insert 270 may be flush with the base of the ball 166, as shown, and the magnet 272 may be circular or annular and mounted in a corresponding boss on the top of the body 244 to attract and hold the magnetic insert 270. A screw 274 may extend through the magnetic insert 270 into the ball 166, with a projecting head to fit in a depression centered in the magnet 272 to form the swivel joint 264 defining the axis 266.

A tongue height and directional alignment light beam projector 280, such as a small low powered laser module, may be mounted in the target body 244 and located and aimed so as to direct a pinpoint beam 282 of visible light forward through the center 258 of the target face 246. This beam 282 of light is useful in initial preparation for backing the towing vehicle 26 toward the trailer 28 or other vehicle that is to be towed. An opening may be provided through the center 258 of the inclined planar face 246, and the projected light beam 282 may be directed through that opening. Alternatively, the inclined face 246 may be imperforate, with its center 258 transparent, and the light beam projector 280 may be located within the trailer unit body 244 so that the beam 282 of light, after refraction through the inclined target face 246, exits forward from the center 258 of the target front face 246 in a direction that is horizontal when the trailer unit body 244 is level as mentioned above.

Appropriate electrical batteries 284 may be provided within the trailer unit body 244 to power the lamps 263 and the light beam projector 280, and appropriate switches 286 are provided to control the circuits.

As shown in FIG. 27, the video monitor screen 204 displays an image of the trailer 28 as seen by the camera 180 when the towing vehicle module 160 is properly mounted and adjusted, and with the towing vehicle 26 in position ahead of the trailer 28, ready to begin backing toward the trailer, but not yet directed precisely toward the trailer 28. The planar front target face 246 of the trailer unit, or target module 162 is clearly visible in the displayed image, and the target graticule 248 on the inclined front target face 246 is also visible on the monitor screen 204. Additionally, the reticle 205 of the camera 180 may also be visible in the monitor screen 204, as is the projected line of the long distance beam 196, which may be of a first color, for example green, shown projected from the lower or long distance guidance light beam projector 192, onto parts of the trailer 28. Another projected beam, 228 which may optionally be a scanned line of a second color such as red, projected by the center light beam projector 226 carried in the upper portion 172 of the towing vehicle module 160, may also be visible on the trailer 28.

A suitable video monitor 164 is available from, for example, the Top Well International Electric company of Guangdong, China, as its model 7109, with a 7-inch diagonal LCD screen with resolution of 480×342 and equipped to receive a 2.4 GHz signal. The system may be operated to utilize a wired cable connection between the towing vehicle module and the video monitor 160 or an installed original equipment video monitor in the towing vehicle 26. Alternatively, the wireless transmitter 240 may be used, together with the antenna 242 and a suitable antenna (not shown) connected to the video monitor 160, either so it can be placed on the exterior of the towing vehicle 26 near the operator's position, or connected through an installed cable to a location near the drawbar 16.

In order to utilize the hitch alignment facilitating system as described above and shown in FIGS. 16-29 for placing the towing vehicle 26 in the correct location for mating the hitch coupler 20 on the trailer tongue 22 to the trailer hitch ball 18' on the towing vehicle 26, the target, or trailer unit 162 is attached to the coupler 20 on the tongue 22 of the trailer 28 or other vehicle that is to be towed, and the towing vehicle module 160 is mounted on the trailer hitch ball 18 of the towing vehicle, as described above. When the trailer unit 162 is level the swivel axis 266 is vertical, and the body or housing 244 may be rotated about the swivel axis 266 until at an angle 124 the beam 282 of light from the light beam projector 280 is directed toward the towing vehicle module 160, as shown in FIGS. 16 and 18. If both the towing vehicle 26 and the vehicle 28 that is to be towed are on flat, level ground, the trailer tongue lift 24 can then be operated to bring the tongue 22 of the trailer 28 to a height at which with the body 244 kept level the beam 282 of light projected from the light projector 280 is directed toward the lens of the camera 180 in the towing vehicle module 160, as shown in FIG. 16. This will place the trailer hitch coupler 20 at a preferred height to provide clearance for the base portion 170 of the towing vehicle module 160 to pass beneath the trailer unit 162 of the hitch-alignment guidance system as the towing vehicle 26 is backed into the hitch-mating position. Once the height of the trailer tongue 22 has been adjusted the light beam projector 280 can be turned off by the switch 286.

With the towing vehicle module 162 mounted and its body 244 level as described above, the central axis of the field of view and the reticle 205 of the camera 180 should be aimed directly rearwardly from the towing vehicle 26 as shown in FIG. 16, so that the laser or other light beams 196 and 228 from the guidance beam projectors 192 and 226 are then also directed rearwardly. The video camera 180 is then turned on and its detected view is displayed as an image in view of the vehicle operator, on the monitor screen 204 in the towing vehicle 26, as shown in FIG. 27. The towing vehicle 26 is then moved backward toward the tongue 22 of the trailer, which can be clearly seen on the monitor screen 204. As the towing vehicle 26 approaches the trailer 28 the towing vehicle 26 should be steered carefully, by observing the video image from the camera 180 in the monitor screen 204, to keep the target face 246 centered in the image displayed on the monitor screen 204. The scanned light beam 196 from the long distance guidance light beam projector 192, impinging as a line on the front of the trailer 28, will be visible on the monitor screen 204 as shown in FIG. 27, once the towing vehicle is within several feet from the required position for connection of the trailer hitch coupler 20 to the trailer hitch ball 18.

As the towing vehicle 26 is backed closer toward the required hitch mating location, the long distance directional guidance light beam 196 will become discernable on the image of the inclined front target face 246, and the front of the towed vehicle module 162 will appear larger in the monitor screen 204 as the camera 180 moves closer to it, as shown in FIG. 28. Once the projected scanned line 196 from the long distance guidance light beam projector 192 is visible on the front target face 246, the towing vehicle 26 should be steered to keep the scanned line 196 centered on the graticule 248 as shown in FIG. 28. Especially if the trailer 28 and the towing vehicle 26 are on anything other than flat level ground, it is desirable, when the towing vehicle 26 and the trailer 28 are separated by a few feet, to confirm that the trailer tongue 22 is at the required height relative to the trailer hitch ball 18 on the towing vehicle 26, as by again operating the light beam projector 280 and, if necessary, adjusting the lift 24 supporting the trailer tongue 22 so that the height adjustment light beam 282 is directed toward the lens of the camera 180.

It should also be apparent to the towing vehicle operator viewing the monitor screen 204 if the height of the trailer tongue 22 is not correct, as the center 258 of the front target face 246 will appear to be too high in the transmitted image from the camera 180 if the trailer tongue 22 is too high, or will appear too low in the image from the camera 180 in the monitor screen 204 if the trailer tongue 22 is too low. If such misalignment appears then the operator should stop backing the towing vehicle 26 toward the trailer 28 and adjust the height of the trailer tongue 22 to be sure that the base portion 170 of the towing vehicle module 160 can pass beneath the towed vehicle module 162.

As the towing vehicle 26 is moved further backwards toward the trailer 28, the long distance directional guidance light beam 196 will appear to move downward and then disappear from view on the graticule 248 as the base portion 170 of the towing vehicle module 160 moves beneath the inclined target front face 246. The light beam 228 of the centrally located light beam projector 226 should then still be already visible as a vertical line on graticule 248, ideally in a color contrasting with the color of the long distance beam 196, indicating that the towing vehicle 26 is very closely approaching the hitch-mating location. The towing vehicle should then be backed very slowly, and the main hitch alignment beam 188 will become visible as a horizontal line and move downward from the top of the inclined front target face 246. As the base portion 170 of the towing vehicle module 160 moves further backward beneath the target face 246, the hitch alignment light beam 188 will appear to move down across the target graticule 248 defined on the inclined target planar face 246, until, when the towing vehicle is in the correct hitch-mating position as shown in FIG. 29, the horizontal line of the hitch alignment light beam 188 and the vertical line of the light beam 228 will appear as a cross in the center 258 of the target on the inclined target plate 246. The towing vehicle operator should then stop the towing vehicle 26, set its brakes, and then remove both modules 160 and 162 of the hitch alignment guidance system from their respective places on the towing vehicle trailer hitch ball 18' and the trailer hitch coupler 20. The trailer tongue 22 can then be lowered to mate the coupler 20 with the trailer hitch ball 18'.

In one somewhat different embodiment of the hitch alignment guidance system shown in FIGS. 30-34, a towing vehicle module 288 is generally similar to the towing vehicle module 160, but its upper portion 172, instead of a light beam projector 226, includes at least one and preferably a pair of "triangulation" light beam projectors 290 and 292. These may also be small laser line generator modules, mounted to scan in vertical scanning planes 294 and 296 and thus to project vertical lines on vertical surfaces. The light beam projectors 290 and 292 may be located on respective opposite lateral side portions of the rear face 202 of the upper portion 172 and may be directed rearward and obliquely laterally inwardly angled. In one embodiment the laser modules 290 and 292 are located so that the vertical scanning plane 294 intersects the vertical scanning plane 296 along a line of intersection 298 extending directly upward along the pivot axis 165 above the center of the hitch ball 18' when the towing vehicle unit 288 is mounted on the hitch ball 18'. To avoid confusion, the laser modules 290 and 292 may project beams of a color contrasting with the color projected by the long distance beam projector 192.

Referring next to FIGS. 32, 33, and 34, when the towing vehicle 26 is several feet away from the trailer 28 and backing directly toward the tongue 22 of the trailer 28, the vertical line light beam projection 196 from the long distance beam projector 192 falls on the inclined front face 246 and is centered on the graticule 248 as shown in FIG. 32. Assuming that the surfaces of the front of the trailer 28 are planar and vertical, the projected beams 294 and 296 will be visible as vertical lines projected on the front of the trailer 28 as shown in FIG. 32.

When the towing vehicle 26 has been moved closer to the trailer 28 than is shown in FIGS. 31 and 32, the beam 196 projected from the long distance beam projector 192 will be interrupted by the tongue 22 and no longer be visible on the upper portion of the trailer, as shown in FIG. 33. Portions of the projected beams 294 and 296 will remain visible on vertical front surfaces of the body of the trailer 28 until they are also interrupted by and become visible on the structure of the tongue 22. As the towing vehicle 26 backs further, the projected beams 294 and 296 will become visible as diagonal lines on the surface of the inclined planar target face 246, first at the upper corners of the target face 246 as shown in FIG. 23, as a result of the orientation of the target face at an angle of 45 degrees with respect to the vertical. So long as the towing vehicle 26 is directed accurately toward the towed vehicle module 162 and the body 244 has been turned to face directly toward the towing vehicle module 288, the projected beams 294 and 296 will be symmetrically oppositely located. As the towing vehicle backs further toward the trailer 28 the beams 294 and 296 will move diagonally downwardly across the target face 246 toward the center 258.

As the towing vehicle 26 backs even closer to the hitch mating position and the rear end 194 of the towing vehicle module 288 moves beneath the towed vehicle module 162, the beam 196 will be obscured. At the same time the diagonal beams 294 and 296 will be seen to move closer to the center 258 of the target face 246 and the horizontal line of the upwardly directed laser beam 188 will appear at the top of the target face 246 and move down toward the center 258 as the towing vehicle is backed very slowly through the final inches. When the towing vehicle 26 reaches the hitch mating position the diagonal beams 294 and 296 and the horizontal beam 188 will all intersect at the center 258 and the target face 246 will appear large in size on the video monitor screen 204, as shown in FIG. 34.

In yet another embodiment of the hitch alignment guidance system a towing vehicle module 302 shown in FIG. 35 differs from the towing vehicle modules 160 and 288 in that there is no light beam projector 186 nor a light beam 188 projected directly upward along the hitch pivot axis 165. Instead, there are left and right triangulation lasers 290 and 292 that project beams 294 and 296 scanning in intersecting vertical planes as in the towed vehicle module 288 described above, and a centrally located light beam projector 304, which may also be a line projecting laser beam module, projects a light beam 306 directed rearward along a vertical central plane that is coincident with the plane in which the light beam 196 is projected by the long distance light beam projector 192 mounted in the rear end 194 of the towing vehicle module 302. The light beam projector 304 thus functions similarly to the light beam projector 226 in the towed vehicle module 160.

As with the towing vehicle module 288, the light beams 294 and 296 intersect with each other on a line 308 extending along the hitch pivot axis 165 when the towing vehicle module 302 is properly mounted on a towing vehicle 26, and the plane of the light beam 306 also includes the same line of intersection 308.

Utilization of the hitch alignment system incorporating the just-described towing vehicle module 302 is basically similar to use of the system with the towing vehicle module 288 as described above, except that when the long distance light beam 196 is obscured, as the rear end 194 of the towing vehicle module 302 passes beneath the body 244 of the towed vehicle module 162, the central light beam 306 still remains visible as a vertical line on the target face 246, so that when the towing vehicle is correctly located in the mating location with respect to the towed vehicle or trailer 28 as shown in FIG. 36 the projected light beams 294 and 296 and the vertical line of the projected beam 306 from the center light beam projector 304 all intersect at the center 258. That is, the line of intersection 308 projects directly upward above the towing vehicle module 302 to the center 258 of the target face 246.

As shown in FIG. 37, in many vehicles which might be utilized as towing vehicles 26, rearwardly directed backup cameras 320 are provided as original equipment, to supply a video image to a video monitor incorporated in the dashboard of the vehicle. Since the lens of such a camera typically has a short focal length and wide-angle capability, the camera 320, typically located higher than the trailer hitch drawbar 16 of such a vehicle, can be incorporated in the hitch alignment guidance system disclosed herein by placing a towed vehicle module 322 above the trailer hitch coupler 20 on the tongue 22 of a towed vehicle 28, in an inverted orientation by comparison with the towed vehicle module 162 previously described. A towing vehicle module 324 may be attached to the rear of the towing vehicle 26, supported on an appropriate bracket 326, the details of which need not be described, except to say that the bracket must be designed or adjustable to support the towing vehicle module 324 in a position in which a main hitch alignment beam projector 328 is located directly above and aimed directly at the top of the trailer hitch ball 18 mounted on the drawbar 16. Also, the mounting bracket 326 must be located in such a position that it does not screen the camera 320 from the hitch ball 18 when the towing vehicle 26 is approaching closely to the trailer 28. As shown in FIG. 37 a projected beam 330, shown in solid line, may be a pinpoint beam or, preferably, a line scanning laser beam projecting a line oriented transversely with respect to the towing vehicle. The light beam 330 projected from the projector 328 may also be in the form of a cruciform scan centered on the hitch ball 18 and having forward and rearward portions indicated in broken line at 332 and aligned in a longitudinal plane with respect to the towing vehicle 26.

A long distance light beam projector 336 located in the towing vehicle module 324 is provided to project a long distance beam 338 directly rearwardly from the towing vehicle 26. The beam projector 336 may be a line producing scanning laser module scanning the laser beam 338 in a vertically and rearwardly aligned plane and through an angle great enough to project the line onto the front surfaces of a trailer or other vehicle 28 to be towed and also scanning downward directly onto the top of the hitch ball 18. The beam 338 will thus fall onto the target face 346 of the towed vehicle module 322 so as to provide directional guidance to the operator of the towing vehicle 26 in the image transmitted by the camera 320 to the built-in video monitor in view of the operator of the towing vehicle 26.

Referring now to FIG. 38, a mounting device 350 to be received in the coupler 22 of a towed vehicle instead of the ball 166 may incorporate a spring-loaded spacer to provide a snug, but adjustable retention without the weight of a metal ball and without the need for balls 166 of different sizes to fit different trailer hitch couplers 22. A lower hemispherical portion 352 which may be somewhat less than a hemisphere has its truncated spherical surfaces 354 facing toward the body 244 of a towed vehicle module 162, taking the place of the lower portion of a trailer hitch ball 166 when the mounting device 350 is captured in a trailer hitch coupler 22. A body 356 of magnetic material which may have the shape of a thick disk is attached to the hemispherical portion 352, so as to be attracted to the magnet 272 in the body 244. A helical compression spring 362 is arranged to urge a cylindrical outer body 364 of the spacer away from the truncated spherical lower body 352. A cylindrical spring socket 366 surrounds the lower end of the spring 362, adjacent the hemispherical portion 352. The cylindrical outer body 364 fits around the spring socket 366 and is movable toward or away from the lower body 352 as indicated by the arrow 368. Interlocking snap rings 369 and 370 may be disposed in grooves in the spring socket 366 and outer body 364 to connect the outer body 364 to the spring socket 366 and retain the spring 362 under compression. To keep the mounting device 350 centered atop the body 244 a projection such as the hemispherical head 372 of a bolt 374, used to attach the magnetic body 356 and the lower body 352 to the spring socket 366, may stand proud of the magnetic metal body 356, and a corresponding centrally located socket 376 may be provided on the top of the body 244, surrounded by the annular magnet 272, to form a swivel so that the body 244 will be located correctly with respect to the coupler 20 and will be able to be turned to a required directional alignment about the central axis of the trailer hitch coupler 20.

The spring 362 can urge the convex upper end of the outer body 364 as a spacer against the upper interior of the coupler 20 and urge the spherical surface 354 against the lower interior clamping surfaces of the coupler 20 to hold the trailer-mounted module 162 adjustably but firmly in place.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. Apparatus for guiding an operator of a towing vehicle being moved toward a hitch-mating position with respect to a vehicle to be towed, wherein the vehicle to be towed is a trailer having a trailer hitch, the apparatus comprising:
   (a) a video camera adapted to be carried on a towing vehicle so as to generate an image of a field of view including a portion of a vehicle to be towed, during a time when the towing vehicle is approaching the hitch-mating position;
   (b) an alignment beam projecting device adapted to be mounted on a hitch ball on the towing vehicle and aimed directly upward;
   (c) a video display device adapted to be located in view of the operator of the towing vehicle and to display the image generated by the video camera during the time when the towing vehicle is approaching the hitch-mating position; and
   (d) a target adapted to be mounted adjacent the trailer hitch on the vehicle to be towed, the target including an inclined target plate located in a position wherein a beam of light projected directly upward from the alignment beam projecting device will impinge visibly on the target and wherein the target will be within the image generated by the video camera, when the video camera and the alignment beam projecting device are mounted on the towing vehicle and the towing vehicle is near the hitch-mating position and approaching the hitch-mating position with respect to the vehicle to be towed.

2. The apparatus of claim 1 wherein the target includes a light beam projector, and wherein when the target is mounted on the vehicle to be towed the target is adjustably movable to a position wherein the light beam projector can project a beam of light toward a predetermined portion of the towing vehicle.

3. The apparatus of claim 1 wherein the trailer hitch includes a coupler portion and the target is included in a towed vehicle module adapted to be attached to the trailer adjacent the coupler portion of the trailer hitch.

4. The apparatus of claim 1 wherein the alignment beam projecting device includes a laser.

5. The apparatus of claim 4 wherein the laser of the alignment beam projecting device is arranged to project a light beam directly upward when the alignment beam projecting device is mounted on the towing vehicle, and wherein the target includes a target face located so as to be struck by the alignment beam from the laser when the target is mounted on the vehicle to be towed and the towing vehicle is within a predetermined distance from said hitch-mating position.

6. The apparatus of claim 1 including a towing vehicle module including the alignment beam projecting device and means for attaching the towing vehicle module to a trailer hitch ball on the towing vehicle.

7. The apparatus of claim 1 wherein the target includes an inclined face including indicia designating a hitch-mating position, said indicia being located at a predetermined location with respect to a coupler element of a hitch of said vehicle to be towed, when said target is mounted on said vehicle to be towed.

8. The apparatus of claim 1 including a towing vehicle module including the alignment beam projecting device, and including an adaptor having a magnet and a socket of a size to fit a trailer hitch ball on the towing vehicle and including mating means for locating the adaptor on the towing vehicle module so that the alignment beam projecting device is in a predetermined location with respect to the socket.

9. The apparatus of claim 1 including a towing vehicle module that includes a long distance guidance beam projector arranged to project a beam of light within said field of view of the video camera so as to fall onto a surface of a vehicle to be towed.

10. The apparatus of claim 9 wherein when the target is mounted on the vehicle to be towed a target face included in the target is located where said beam of light from said long distance guidance projector will fall on the target face and will be visible in the image generated by said video camera when the towing vehicle approaches the hitch-mating position within a predetermined distance.

11. The apparatus of claim 10 wherein said towing vehicle unit includes a close range beam projector arranged to project a linearly scanning beam of light so that said linearly scanning beam of light falls visibly on said target face and is visible in the image generated by said video camera when said towing vehicle approaches said hitch-mating position within a predetermined distance.

12. The apparatus of claim 1 wherein said video camera is capable of tracking said target.

13. The apparatus of claim 1 wherein said target is part of a towed vehicle module having a body connected with a mounting device through a swivel connection and wherein the mounting device includes a lower hemispherical portion and a spring-loaded spacer arranged to fit in a ball-receiving coupler portion of a trailer hitch.

14. Apparatus for guiding an operator of a towing vehicle being backed toward a hitch-mating position with respect to a vehicle to be towed, comprising:
   (a) a primary hitch alignment light beam projector mounted on a hitch ball carried on the towing vehicle and aimed directly upward and arranged to project a beam of light directly upward in a position having a predetermined relationship to a pivot axis defined by a hitch part carried on the towing vehicle;

(b) a target located in a predetermined position with respect to a hitch coupler on a vehicle to be towed, the target including an inclined target plate located so as to be struck by a beam of light projected directly upward from the hitch alignment light beam projector when the towing vehicle is near the hitch-mating position;

(c) a camera carried on the towing vehicle in a location where the camera can form an image of the target when the towing vehicle is in a preliminary position from which it can be backed toward the hitch-mating position with respect to the vehicle to be towed; and (d) an image display device located in view of the operator of the towing vehicle and arranged to display of at least a part of an image formed by the camera.

15. The apparatus of claim 14 including a long distance directional guidance light beam projector arranged to project a beam of light rearwardly from the towing vehicle so as to fall onto a surface of the vehicle to be towed when the towing vehicle is in said preliminary position and ready to be backed toward the vehicle to be towed.

16. The apparatus of claim 15 wherein said long distance directional guidance light beam projector projects a beam in a vertical plane so as to be visible as a line on an object behind the towing vehicle.

17. The apparatus of claim 14 including a pair of light beam projectors mounted on the towing vehicle and projecting respective convergent beams rearwardly at predetermined angles toward the vehicle to be towed.

18. The apparatus of claim 17 wherein the beams projected by said pair of light beam projectors intersect each other and define a line of intersection extending along said pivot axis.

19. A method for moving a towing vehicle into a desired hitch-mating position with respect to a trailer, comprising:

(a) operating a video camera near a first trailer hitch part mounted on the towing vehicle and intended to be mated with a trailer hitch coupler connected with front part of the trailer, and thereby creating a video image of an area beyond the first trailer hitch part in a general direction in which the towing vehicle is to move toward the hitch-mating position, and transmitting said video image from the video camera;

(b) mounting a visual target including an inclined target plate on the trailer so that the target plate is in a predetermined location with respect to the trailer hitch coupler and is in a downwardly facing inclined orientation;

(c) projecting a beam of light directly upward from a projecting device mounted on a hitch ball having a predetermined location on the towing vehicle with respect to the first trailer hitch part mounted on the towing vehicle, the inclined target plate being located so as to be struck by the beam of light projected directly upward when the towing vehicle is near the hitch-mating position;

(d) observing said video image on a video imaging device while backing the towing vehicle toward the trailer hitch coupler;

(e) steering the towing vehicle in response to viewing the video image so as to include at least a part of said visual target in said video image, while moving the towing vehicle rearwardly toward the hitch-mating position until the beam of light projected directly upward falls on the target face;

(f) observing the video image of the visual target including an image of the beam of light projected directly upward impinging on the target plate while moving the towing vehicle further toward the desired hitch-mating position for mating the trailer hitch coupler of the trailer with the trailer hitch part on the towing vehicle; and (g) stopping the towing vehicle when the beam of light projected directly upward falls on a predetermined part of the target plate.

20. The method of claim 19 including the step of projecting a directional guidance beam of light rearwardly from the towing vehicle, observing in said video image where said directional guidance beam of light falls on the trailer, and steering the towing vehicle in response to observing where said directional guidance beam of light falls on the trailer.

21. The method of claim 19 including the step of carrying said video camera on said first trailer hitch part on the towing vehicle.

22. The method of claim 19 including the step of adjusting the position of the visual target on the trailer to direct the visual target toward the towing vehicle before moving the towing vehicle closer to the trailer than a predetermined distance.

23. The method of claim 19 including the step of placing the video camera in a predetermined orientation with respect to the towing vehicle before moving the towing vehicle within a predetermined distance from the trailer hitch coupler.

24. Apparatus for guiding an operator of a towing vehicle being hitched to a trailer, comprising:

(a) a towing vehicle module adapted to be mounted on a towing vehicle, the towing vehicle module including a light beam projector adapted to be mounted on a hitch ball and aimed directly upward and arranged to project a beam of light in a predetermined direction relative to the towing vehicle module when the towing vehicle module is mounted on the hitch ball on the towing vehicle in a predetermined position with respect to a trailer hitch part on the towing vehicle;

(b) a trailer module adapted to be mounted on the trailer so as to be located in a predetermined position with respect to a trailer hitch coupler when said trailer module is mounted on said trailer, the trailer module including a target including an inclined target plate and having visual indicia on a target face, the target plate being located so as to be struck by a beam of light projected directly upward from the light beam projector when the towing vehicle is near a hitch-mating position.

25. The apparatus of claim 24 wherein the towing vehicle module includes a mounting device arranged to attach the towing vehicle module to the towing vehicle in said predetermined position.

26. The apparatus of claim 24 wherein the trailer module includes a mounting device arranged to attach the trailer module to the trailer hitch coupler and permit the trailer module to be swiveled.

27. The apparatus of claim 24 including a video camera arranged to be mounted on the towing vehicle so as to view said indicia of said target face when said trailer module is mounted on said trailer in said predetermined position.

28. The apparatus of claim 24 wherein said light beam projector of said towing vehicle module includes a laser and wherein said towing vehicle module includes a reflector located so as to direct a laser beam from said laser directly upward from said towing vehicle module when said towing vehicle module is mounted on a towing vehicle.

29. The apparatus of claim 28 wherein said laser beam is reflected directly upward from a location having a predetermined relationship to a hitch pivot axis location defined on said towing vehicle, when said towing vehicle module is mounted on said hitch ball on said towing vehicle in said predetermined position.

30. The apparatus of claim 29 wherein said laser beam is reflected directly upward along said hitch pivot axis when said towing vehicle module is mounted on said hitch ball on said towing vehicle in said predetermined position.

31. The apparatus of claim 24 wherein said towing vehicle module includes a video camera having a field of view including and extending on each side of a hitch-mating direction defined with respect to said towing vehicle module.

32. The apparatus of claim 24 wherein said towing vehicle module includes a pair of line-generator laser modules aligned with each other so that respective planes defined by line generation scans of the laser modules intersect with each other and define a line of intersection extending in a predetermined direction from a predetermined location with respect to said towing vehicle module.

33. The apparatus of claim 32 wherein said line extends upward above a hitch pivot axis location on said towing vehicle module.

34. The apparatus of claim 32 wherein the laser modules of said pair of line-generator laser modules are spaced apart from each other laterally, on opposite lateral sides of said towing vehicle module, and wherein each one of said pair of laser modules is arranged to project a beam directed obliquely inwardly toward a hitch pivot axis location on the towing vehicle module.

35. The apparatus of claim 34, said towing vehicle module including a centrally located line scanning laser module arranged to project a beam scanning in a vertical plane including said line and wherein said line extends upward above said predetermined location with respect to said towing vehicle module.

36. The apparatus of claim 35 wherein said predetermined location with respect to said towing vehicle module is a hitch pivot axis location defined on said towing vehicle module.

37. The apparatus of claim 24, further including a line generating laser module located in said towing vehicle module so as to project a beam in a vertical plane including said hitch pivot axis.

38. Apparatus for guiding an operator of a towing vehicle as it is being hitched to a trailer, comprising:
  (a) a towing vehicle module adapted to be mounted on a towing vehicle, the towing vehicle module including first and second laser modules each capable of producing a linear scan beam pattern, the first and second laser modules being located in the towing vehicle module so as to generate beams scanned in respective vertical planes, projected generally in a hitch approaching direction and so that the vertical planes of the scanned beams intersect each other and define a line of intersection extending upwardly in a predetermined location with respect to a hitch pivot point on the towing vehicle module; and
  (b) a target module including an inclined target plate and having a target face, the target module being adapted to be mounted on a trailer in a predetermined location, with the target face directed downwardly at a predetermined inclination and with the inclined target plate located so as to be struck by a beam of light projected directly upward along the line of intersection and the target plate including a surface on which an incident beam from one of said laser modules is visible.

39. The apparatus of claim 38 wherein said line defined by intersection of said vertical planes of said linear scan beam patterns extends upwardly directly above said hitch pivot point on said towing vehicle module.

40. The apparatus of claim 39 wherein said towing vehicle module includes a reflector located at said hitch pivot point and a laser module arranged to provide a main alignment laser beam reflected upward above said hitch pivot point on said towing vehicle module.

41. The apparatus of claim 40 wherein said main alignment laser beam is a scanned cruciform beam.

42. The apparatus of claim 38 wherein said towing vehicle module includes a long distance directional light beam generator oriented in a hitch-approaching direction.

43. The apparatus of claim 42 wherein said long distance directional light beam generator is a line generating laser module.

* * * * *